US012709133B2

(12) United States Patent
Zhao et al.

(10) Patent No.: US 12,709,133 B2
(45) Date of Patent: Aug. 18, 2026

(54) TRANSPORTATION DEVICE AND THERMAL MANAGEMENT SYSTEM AND THERMAL MANAGEMENT METHOD THEREFOR

(71) Applicant: CONTEMPORARY AMPEREX INTELLIGENCE TECHNOLOGY (SHANGHAI) LIMITED, Shanghai (CN)

(72) Inventors: Yu Zhao, Shanghai (CN); Yu Liu, Shanghai (CN); Liwen Jiang, Shanghai (CN)

(73) Assignee: CONTEMPORARY AMPEREX INTELLIGENCE TECHNOLOGY (SHANGHAI) LIMITED, Shanghai (CN)

( * ) Notice: Subject to any disclaimer, the term of this patent is extended or adjusted under 35 U.S.C. 154(b) by 126 days.

(21) Appl. No.: 18/749,015

(22) Filed: Jun. 20, 2024

(65) Prior Publication Data

US 2024/0336114 A1 Oct. 10, 2024

Related U.S. Application Data

(63) Continuation of application No. PCT/CN2022/129631, filed on Nov. 3, 2022.

(51) Int. Cl.
*B60H 1/00* (2006.01)

(52) U.S. Cl.
CPC ..... *B60H 1/00878* (2013.01); *B60H 1/00278* (2013.01); *B60H 2001/00949* (2013.01)

(58) Field of Classification Search
CPC ............ B60H 1/00878; B60H 1/00278; B60H 1/00885; B60H 1/00899; B60H 1/00392;
(Continued)

(56) References Cited

U.S. PATENT DOCUMENTS 10,343,483 B2 7/2019 Kim
2011/0174000 A1* 7/2011 Richter ............. B60H 1/00064 62/93

(Continued)

FOREIGN PATENT DOCUMENTS

CN 102275521 A 12/2011
CN 205130860 U 4/2016

(Continued)

OTHER PUBLICATIONS

The World Intellectual Property Organization (WIPO) International Search Report and Written Opinion for PCT/CN2022/129631 Jul. 20, 2023 14 Pages (including translation).

(Continued)

*Primary Examiner* — Marc E Norman
(74) *Attorney, Agent, or Firm* — ANOVA LAW GROUP, PLLC

(57) ABSTRACT

A transportation device and a thermal management system and method therefor are disclosed. The thermal management system includes an air-conditioning system, a thermal management loop, and an auxiliary heater. The thermal management loop is configured to circulate a first heat-conducting medium to perform thermal management on a specified part of the transportation device. The thermal management loop is capable of exchanging heat with the air-conditioning system to selectively transfer heat generated by the specified part to the air-conditioning system at least when the air-conditioning system is in a heating state, to provide at least a partial heat source for an evaporation process of the air-conditioning system. The auxiliary heater is configured to selectively replenish heat for the thermal management loop. This solution improves the heating effect of the air-conditioning system.

20 Claims, 9 Drawing Sheets

(58) Field of Classification Search
CPC ................ B60H 1/143; B60H 1/32284; B60H 2001/00949; B60H 2001/00928; B60H 2001/0307
See application file for complete search history.

(56) References Cited

U.S. PATENT DOCUMENTS

| | | | |
|---|---|---|---|
| 2012/0183815 A1 | 7/2012 | Johnston et al. | |
| 2013/0175022 A1 | 7/2013 | King et al. | |
| 2020/0047583 A1 | 2/2020 | Ishizeki et al. | |
| 2020/0047591 A1* | 2/2020 | He | B60H 1/32284 |

FOREIGN PATENT DOCUMENTS

| | | |
|---|---|---|
| CN | 211592164 U | 9/2020 |
| CN | 112074425 A | 12/2020 |
| CN | 112172457 A | 1/2021 |
| CN | 212289438 U | 1/2021 |
| CN | 113895205 A | 1/2022 |
| CN | 113993731 A | 1/2022 |
| CN | 114056030 A | 2/2022 |
| CN | 114056052 A | 2/2022 |
| CN | 114347752 A | 4/2022 |

OTHER PUBLICATIONS

The European Patent Office (EPO) The Extended European Search Report for Application No. 22963956.2 Feb. 5, 2025 9 Pages.
The Japan Patent Office (JPO) Notice of Reasons for Refusal for Application No. 2025-513027 Apr. 21, 2026 10 Pages (including translation).

* cited by examiner

TRANSPORTATION DEVICE AND THERMAL MANAGEMENT SYSTEM AND THERMAL MANAGEMENT METHOD THEREFOR

CROSS-REFERENCE TO RELATED APPLICATION

This application is a continuation of International Application No. PCT/CN2022/129631, filed on Nov. 3, 2022, the entire content of which is incorporated herein by reference.

TECHNICAL FIELD

This application pertains to the field of thermal management technologies, and in particular, to a transportation device and a thermal management system and thermal management method therefor.

BACKGROUND

In winter when the temperature is low, air conditioners are usually used in transportation devices (such as cars) to raise the temperature in the internal space of the devices, thus achieving the effect of heating. For example, at present, electric air conditioners with a heat pump function are mostly used for indoor heating of electric vehicles. Under low-temperature working conditions, heat pump air conditioning has problems such as low heat pump efficiency, making it difficult to meet the heating needs. At present, a general solution is to add an additional auxiliary heater to directly exchange heat with the heating heat exchanger in the internal space of a car. In this case, to achieve the purpose of heat exchange, the heating temperature of the auxiliary heater needs to exceed the target temperature required by the internal space of the device, requiring high specifications (such as the heating power and volume) of the auxiliary heater.

SUMMARY

In view of the foregoing problems, this application provides a transportation device and a thermal management system and thermal management method therefor, so as to solve the above technical problems, thereby improving the heating effect of an air-conditioning system under low-temperature working conditions, and effectively reducing specifications of an auxiliary heater.

This application provides a thermal management system for a transportation device. The system includes an air-conditioning system, a thermal management loop, and an auxiliary heater. The thermal management loop is configured to circulate a first heat-conducting medium to perform thermal management on a specified part of the transportation device. The thermal management loop may be further configured to exchange heat with the air-conditioning system to selectively transfer heat generated by the specified part to the air-conditioning system at least when the air-conditioning system is in a heating state, to provide at least a partial heat source for an evaporation process of the air-conditioning system. The auxiliary heater is configured to selectively replenish heat for the thermal management loop. In the foregoing solution, the auxiliary heater is disposed in the thermal management loop, so that the auxiliary heater can replenish heat for the thermal management loop and the air-conditioning system can effectively absorb heat from the thermal management loop under low-temperature and other working conditions, thereby reducing pressure of the air-conditioning system and improving the heating effect of the air-conditioning system. In addition, the heating temperature of the auxiliary heater only needs to ensure that the air-conditioning system can absorb heat effectively, only part of heat supplied by the air-conditioning system comes from the auxiliary heater, and the other part comes from the compression work inside the air-conditioning system. Therefore, specifications of the auxiliary heater can be effectively reduced, a space utilization rate can be improved, and costs can be reduced.

In some embodiments, the thermal management system further includes a control module, and the control module controls, in response to the heat generated by the specified part not meeting a heat supply demand of the air-conditioning system, the auxiliary heater to replenish heat for the thermal management loop. In the foregoing solution, the control module is used to control, based on the heat supply demand of the air-conditioning system, the auxiliary heater to replenish heat for the thermal management loop, so that the air-conditioning system can effectively absorb heat from the thermal management loop, thereby realizing automatic control.

In some embodiments, the thermal management system further includes a detection module, where the detection module is configured to detect an operating state or an operating environment of the air-conditioning system when the air-conditioning system is in a heating state, and the control module determines, based on a detection result of the detection module, whether the heat generated by the specified part meets the heat supply demand of the air-conditioning system. In the foregoing solution, the detection module detects the operating state or the operating environment of the air-conditioning system, so that the control module can determine whether the heat generated by the specified part meets the heat supply demand of the air-conditioning system, thereby realizing automatic control.

In some embodiments, the operating environment includes temperature of the first heat-conducting medium, the detection module is configured to detect the temperature of the first heat-conducting medium before heat exchange between the first heat-conducting medium and the air-conditioning system, and the control module determines, in response to the temperature detected by the detection module being lower than a preset temperature threshold, that the heat generated by the specified part does not meet the heat supply demand of the air-conditioning system. In the foregoing solution, the temperature of the first heat-conducting medium is detected before the heat exchange between the first heat-conducting medium and the air-conditioning system to determine whether the heat generated by the specified part meets the heat supply demand of the air-conditioning system. The detection method is relatively simple and a detection result is more accurate.

In some embodiments, the control module is further capable of controlling, in response to a heat supply demand of the specified part itself, the auxiliary heater to replenish heat for the thermal management loop, so as to heat the specified part through the first heat-conducting medium. In the foregoing solution, it is beneficial to maintain a normal working state of the specified part by controlling the auxiliary heater to replenish heat for the thermal management loop under a condition that the specified part has its own heat supply demand.

In some embodiments, the thermal management loop includes a main heat exchange zone for exchanging heat with the specified part and an auxiliary heat exchange zone for exchanging heat with the auxiliary heater, and the thermal management loop further includes a flow distribution component and a bypass line connected in parallel with the main heat exchange zone. The control module controls, based on the heat supply demand of the specified part and the heat supply demand of the air-conditioning system, the flow distribution component to perform flow distribution on the first heat-conducting medium between the main heat exchange zone and the bypass line. In the foregoing solution, the flow distribution component performs flow distribution on the first heat-conducting medium between the main heat exchange zone and the bypass line, so as to adjust heat distribution supplied to the specified part and the air-conditioning system based on different working conditions.

In some embodiments, the first heat-conducting medium flows to the main heat exchange zone and the bypass line after being heated by the auxiliary heat exchange zone, and exchanges heat with the air-conditioning system before entering the auxiliary heat exchange zone, or the first heat-conducting medium heated by the auxiliary heat exchange zone flows to the main heat exchange zone and the bypass line after exchanging heat with the air-conditioning system, and is heated by the auxiliary heat exchange zone after flowing through the main heat exchange zone and/or the bypass line. In the foregoing solution, effects of heat distribution between the specified part and the air-conditioning system can be improved by optimizing a disposing position of the auxiliary heat exchange zone.

In some embodiments, the specified part is a battery module of the transportation device, and the control module controls, in response to output power of the battery module not meeting an external power demand, the flow distribution component to preferentially meet the heat supply demand of the battery module through the auxiliary heater, or controls, in response to output power of the battery module being capable of meeting an external power demand, the flow distribution component to preferentially meet the heat supply demand of the air-conditioning system through the auxiliary heater. In the foregoing solution, under a condition that the output power of the battery module does not meet the external power demand, the battery module is preferentially heated to improve the output power of the battery module, thereby ensuring normal operation of the transportation device.

In some embodiments, the preferentially meeting the heat supply demand of the battery module is to supply all the first heat-conducting medium to the main heat exchange zone or increase a flow capacity of the first heat-conducting medium flowing to the main heat exchange zone, and the preferentially meeting the heat supply demand of the air-conditioning system is to supply all the first heat-conducting medium to the bypass line or increase a flow capacity of the first heat-conducting medium flowing to the bypass line. In the foregoing solution, the battery module can be heated better by supplying all the first heat-conducting medium to the main heat exchange zone or increasing the flow capacity of the first heat-conducting medium flowing to the main heat exchange zone. The air-conditioning system can better absorb heat from the thermal management loop by supplying all the first heat-conducting medium to the bypass line or increasing the flow capacity of the first heat-conducting medium flowing to the bypass line.

In some embodiments, the control module is further capable of: after the heat supply demand of the air-conditioning system is preferentially met, controlling, in response to the thermal management loop meeting the heat supply demand of the air-conditioning system, the flow distribution component to reduce the flow capacity of the first heat-conducting medium flowing to the bypass line and increase the flow capacity of the first heat-conducting medium flowing to the main heat exchange zone, or controlling, in response to the thermal management loop not meeting the heat supply demand of the air-conditioning system, the flow distribution component to increase the flow capacity of the first heat-conducting medium flowing to the bypass line and reduce the flow capacity of the first heat-conducting medium flowing to the main heat exchange zone. In the foregoing solution, the heat supply demands of the air-conditioning system and the battery module are dynamically balanced through flow distribution.

In some embodiments, the thermal management loop includes at least two thermal management sub-loops, the at least two thermal management sub-loops are configured to perform thermal management on different specified parts, the thermal management system further includes a thermal management switching component, and the control module controls the thermal management switching component to selectively switch a heat exchange relationship between the at least two thermal management sub-loops and the air-conditioning system. In the foregoing solution, different thermal management sub-loop combinations can be used to provide heat to the air-conditioning system based on different working conditions by selectively switching the heat exchange relationship between the at least two thermal management sub-loops and the air-conditioning system.

In some embodiments, the specified part includes the battery module and a motor module of the transportation device, and the at least two thermal management sub-loops include a first thermal management sub-loop and a second thermal management sub-loop. The first thermal management sub-loop is configured to perform thermal management on the battery module, and includes a first main heat exchange zone for heat exchange with the battery module and the auxiliary heat exchange zone for heat exchange with the auxiliary heater; the second thermal management sub-loop is configured to perform thermal management on the motor module and includes a second main heat exchange zone for heat exchange with the motor module and an external heat exchanger for heat exchange with an external environment; and the control module controls, in response to the air-conditioning system being in the heating state, the thermal management switching component to switch at least one of the first thermal management sub-loop and the second thermal management sub-loop to exchanging heat with the air-conditioning system. In the foregoing solution, two main heat sources (namely, the battery module and the motor module) of the transportation device are thermally managed through two thermal management sub-loops, so that a heat recovery utilization rate can be improved. Meanwhile, the auxiliary heater is disposed in a thermal management sub-loop in which the battery module is located, so that the battery module can be selectively heated by using a heating function of the auxiliary heater, thereby improving the low-temperature starting performance of the transportation device.

In some embodiments, the control module is further capable of controlling, in response to the air-conditioning system being in the heating state, the thermal management switching component to switch the first thermal management sub-loop and the second thermal management sub-loop to simultaneously exchanging heat with the air-conditioning system. In the foregoing solution, the heat recovery utilization rate can be improved by switching the first thermal management sub-loop and the second thermal management sub-loop to simultaneously exchanging heat with the air-conditioning system.

In some embodiments, the control module is further capable of controlling the thermal management switching component to connect the first thermal management sub-loop and the second thermal management sub-loop, so that the first heat-conducting medium circulates in an entire loop formed by the first thermal management sub-loop and the second thermal management sub-loop. In the foregoing solution, heat balance can be ensured and the thermal management effect can be improved by switching the first thermal management sub-loop and the second thermal management sub-loop to simultaneously exchanging heat with the air-conditioning system and enabling the first thermal management sub-loop and the second thermal management sub-loop to communicate with each other.

In some embodiments, the first thermal management sub-loop further includes a first flow distribution component and a first bypass line connected in parallel with the first main heat exchange zone, where the control module controls, based on the heat supply demand of the specified part and the heat supply demand of the air-conditioning system, the first flow distribution component to perform flow distribution on a first heat-conducting medium in the first thermal management sub-loop between the first main heat exchange zone and the first bypass line. In the foregoing solution, the first flow distribution component performs flow distribution on the first heat-conducting medium between the first main heat exchange zone and the first bypass line, so as to adjust heat distribution supplied to the battery module and the air-conditioning system based on different working conditions.

In some embodiments, the second thermal management sub-loop further includes a second flow distribution component and a second bypass line connected in parallel with the external heat exchanger, where the control module controls, based on a heat dissipation demand of the motor module, the heat supply demand of the air-conditioning system, or the external environment of the external heat exchanger, the second flow distribution component to perform flow distribution on a first heat-conducting medium in the second thermal management sub-loop between the external heat exchanger and the second bypass line. In the foregoing solution, the heat dissipation demand of the motor module and/or the heat supply demand of the air-conditioning system can be dynamically met by performing flow distribution on the first heat-conducting medium in the second thermal management sub-loop between the external heat exchanger and the second bypass line.

In some embodiments, in response to the motor module having no additional heat dissipation demand after supplying heat to the air-conditioning system or the motor module not meeting the heat supply demand of the air-conditioning system and being incapable of absorbing heat from the environment through the external heat exchanger, the control module introduces all the first heat-conducting medium in the second thermal management sub-loop into the second bypass line or increases the flow capacity of the first heat-conducting medium flowing to the second bypass line, or in response to the motor module still having an additional heat dissipation demand after supplying heat to the air-conditioning system or the motor module not meeting the heat supply demand of the air-conditioning system and being capable of absorbing heat from the environment through the external heat exchanger, the control module introduces all the first heat-conducting medium in the second thermal management sub-loop into the external heat exchanger or increases the flow capacity of the first heat-conducting medium flowing to the external heat exchanger. In the foregoing solution, the heat dissipation demand of the motor module and the heat supply demand of the air-conditioning system can be dynamically balanced based on actual working conditions of the motor module and the air-conditioning system. In addition, an additional heat loss can be avoided when the external heat exchanger cannot absorb heat from the environment, and heat supply to the air-conditioning system can be increased when the external heat exchanger can absorb heat from the environment.

In some embodiments, the air-conditioning system includes a first air-conditioning loop and a second air-conditioning loop. The first air-conditioning loop is configured to circulate a refrigerant and includes a compressor, a condensing heat exchanger, a liquid reservoir, a first evaporation heat exchanger, and a second evaporation heat exchanger, where the refrigerant absorbs heat by evaporation in the first evaporation heat exchanger, to cool a specified region of the transportation device by air conditioning, and the refrigerant absorbs heat by evaporation in the second evaporation heat exchanger, to absorb heat from the thermal management loop; and the second air-conditioning loop is configured to circulate a second heat-conducting medium and includes a heating heat exchanger, where the heating heat exchanger exchanges heat with the condensing heat exchanger, to heat the specified region by air conditioning. In the foregoing solution, air-conditioning heating is realized through heat exchange between the heating heat exchanger and the condensing heat exchanger. This can simplify a flow path design of the air-conditioning system.

In some embodiments, the control module is further capable of controlling, in response to the air-conditioning system being in a refrigeration state, the thermal management switching component to switch the second thermal management sub-loop to exchanging heat with the condensing heat exchanger, to transfer heat released by the condensing heat exchanger to the external heat exchanger. In the foregoing solution, in the refrigeration state, the second thermal management sub-loop is switched to performing heat exchange with the condensing heat exchanger, so that the external heat exchanger in the second thermal management sub-loop can be fully utilized to dissipate heat from the condensing heat exchanger.

In some embodiments, the air-conditioning system further includes a first air-conditioning switching component, the second thermal management sub-loop and the second air-conditioning loop are each connected to the condensing heat exchanger through the first air-conditioning switching component, and the control module is further capable of controlling the first air-conditioning switching component to selectively supply the first heat-conducting medium in the second thermal management sub-loop and the second heat-conducting medium in the second air-conditioning loop to the condensing heat exchanger. In the foregoing solution, the first heat-conducting medium and the second heat-conducting medium are selectively supplied to the condensing heat exchanger through the first air-conditioning switching component, so that the second thermal management sub-loop and the second air-conditioning loop can share a flow path in the condensing heat exchanger. A structure of the condensing heat exchanger is simplified.

In some embodiments, the control module is further capable of switching, in response to the air-conditioning system being in the refrigeration state, the first thermal management sub-loop to exchanging heat with the second evaporation heat exchanger, to cool the battery module using the second evaporation heat exchanger. In the foregoing solution, in the refrigeration state, the first thermal management sub-loop is switched to exchanging heat with the second evaporation heat exchanger, so that the battery module can be cooled using the second evaporation heat exchanger.

In some embodiments, the air-conditioning system further includes a first air-conditioning switching component and a second air-conditioning switching component, and the control module controls, in response to the air-conditioning system being in a dehumidification state, the first air-conditioning switching component to connect the heating heat exchanger and the condensing heat exchanger and controls the second air-conditioning switching component to connect the liquid reservoir and the first evaporation heat exchanger, so that dehumidified air cooled by the first evaporation heat exchanger is able to be heated by the heating heat exchanger. In the foregoing solution, the air-conditioning system also has a dehumidification state by disposing the first air-conditioning switching component and the second air-conditioning switching component.

This application provides a thermal management method for a transportation device, where the transportation device includes an air-conditioning system, a thermal management loop, and an auxiliary heater. The thermal management loop performs thermal management on a battery module of the transportation device and is capable of exchanging heat with the air-conditioning system to provide at least a partial heat source for an evaporation process of the air-conditioning system. The method includes: controlling, in response to heat supply demands of both the battery module and the air-conditioning system, the auxiliary heater to replenish heat for the thermal management loop; identifying whether output power of the battery module meets an external power demand; and controlling, in response to the output power of the battery module not meeting the external power demand, the thermal management loop to preferentially meet the heat supply demand of the battery module; or controlling, in response to the output power of the battery module being capable of meeting the external power demand, the thermal management loop to preferentially meet the heat supply demand of the air-conditioning system. In the foregoing solution, the auxiliary heater is disposed in the thermal management loop; under a condition that the transportation device is in a low-temperature working condition and both the battery module and the air-conditioning system have heat supply demands, the auxiliary heater is used to meet the heat supply demands of the battery module and the air-conditioning system separately; and based on working characteristics of the battery module and the air-conditioning system, the battery module is preferentially heated under a condition that the output power of the battery module does not meet the external power demand, so as to improve the output power of the battery module and ensure normal working of the transportation device.

In some embodiments, the thermal management loop includes a main heat exchange zone for exchanging heat with the battery module, an auxiliary heat exchange zone for exchanging heat with the auxiliary heater, a flow distribution component, and a bypass line connected in parallel with the main heat exchange zone, where the flow distribution component is configured to perform flow distribution on the first heat-conducting medium between the main heat exchange zone and the bypass line, the preferentially meeting the heat supply demand of the battery module is to control the flow distribution component to supply all the first heat-conducting medium to the main heat exchange zone or increase a flow capacity of the first heat-conducting medium flowing to the main heat exchange zone, and the preferentially meeting the heat supply demand of the air-conditioning system is to control the flow distribution component to supply all the first heat-conducting medium to the bypass line or increase a flow capacity of the first heat-conducting medium flowing to the bypass line. In the foregoing solution, the battery module can be heated better by controlling the first heat-conducting medium to supply all the first heat-conducting medium to the main heat exchange zone or increasing the flow capacity of the first heat-conducting medium flowing to the main heat exchange zone. The air-conditioning system can better absorb heat from the thermal management loop by supplying all the first heat-conducting medium to the bypass line or increasing the flow capacity of the first heat-conducting medium flowing to the bypass line.

In some embodiments, after the step of controlling, in response to the output power of the battery module being capable of meeting the external power demand, the thermal management loop to preferentially meet the heat supply demand of the air-conditioning system, the method further includes: controlling, in response to the heat supply of the thermal management loop to the air-conditioning system reaching the heat supply demand of the air-conditioning system, the thermal management loop to reduce heat supply to the air-conditioning system and increase heat supply to the battery module; or controlling, in response to the heat supply of the thermal management loop to the air-conditioning system being lower than the heat supply demand of the air-conditioning system, the thermal management loop to increase heat supply to the air-conditioning system and reduce heat supply to the battery module. In the foregoing solution, the heat supply demands of the air-conditioning system and the battery module are dynamically balanced through heat distribution.

This application provides a transportation device, where the transportation device includes the thermal management system described above. In the foregoing solution, the auxiliary heater is disposed in the thermal management loop, so that the auxiliary heater can replenish heat for the thermal management loop and the air-conditioning system can effectively absorb heat from the thermal management loop under low-temperature and other working conditions, thereby reducing pressure of the air-conditioning system and improving the heating effect of the air-conditioning system. In addition, the heating temperature of the auxiliary heater only needs to ensure that the air-conditioning system can absorb heat effectively, only part of heat supplied by the air-conditioning system comes from the auxiliary heater, and the other part comes from the compression work inside the air-conditioning system. Therefore, specifications of the auxiliary heater can be effectively reduced, a space utilization rate can be improved, and costs can be reduced.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of the embodiments below. The accompanying drawings are merely intended to illustrate some embodiments and are not intended to limit this application. In addition, in all the accompanying drawings, like parts are denoted by like reference signs.

Figure 1:
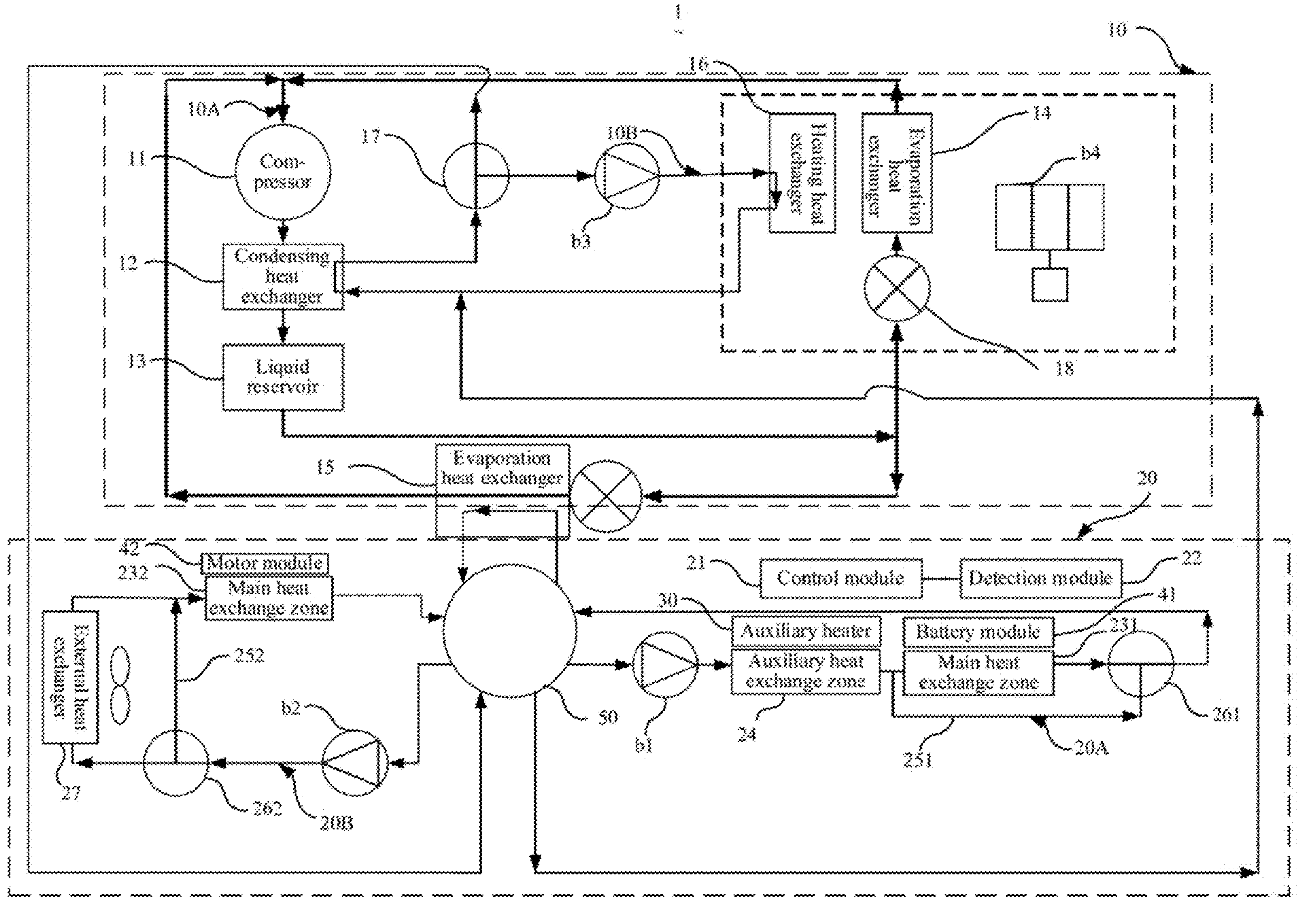
FIG. 1 is a schematic block diagram of an embodiment of a thermal management system of a transportation device according to this application.

In the accompanying drawings, the figures are not necessarily drawn to scale.

Reference signs in specific embodiments are as follows:

1. thermal management system, 10. air-conditioning system, 20. thermal management loop, 21. control module, 22. detection module, 20A and 20B. thermal management sub-loop, 231 and 232. main heat exchange zone, 24. auxiliary heat exchange zone, 251 and 252. bypass line, 261 and 262. flow distribution component, 41. battery module, 30. auxiliary heater, 27. external heat exchanger, 42. motor module, 50. thermal management switching component, 10A and 10B. air-conditioning loop, 11. compressor, 12. condensing heat exchanger, 13. liquid reservoir, 14 and 15. evaporation heat exchanger, 16. heating heat exchanger, 17 and 18. air-conditioning switching component, b1, b2, and b3. water pump, b4. blower, and 100. transportation device.

DESCRIPTION OF EMBODIMENTS

The following describes in detail the embodiments of technical solutions of this application with reference to the accompanying drawings. The following embodiments are merely intended for a clearer description of the technical solutions of this application and therefore are used as just examples which do not constitute any limitations on the protection scope of this application.

Unless otherwise defined, all technical and scientific terms used herein shall have the same meanings as commonly understood by those skilled in the art to which this application relates. The terms used herein are intended to merely describe the specific embodiments rather than to limit this application. The terms "include", "have", and any other variations thereof in the specification, claims and brief description of drawings of this application are intended to cover non-exclusive inclusions.

In the description of the embodiments of this application, the terms "first", "second", and the like are merely intended to distinguish between different objects, and shall not be understood as any indication or implication of relative importance or any implicit indication of the number, sequence or primary-secondary relationship of the technical features indicated. In the description of the embodiments of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may be combined with another embodiment.

In the descriptions of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects. In this disclosure, the phrases "at least one of A, B, and C" and "at least one of A, B, or C" both mean only A, only B, only C, or any combination of A, B, and C.

In the description of the embodiments of this application, the term "a plurality of" means more than two (inclusive). Similarly, "a plurality of groups" means more than two (inclusive) groups, and "a plurality of pieces" means more than two (inclusive) pieces.

In the descriptions of embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of embodiments of this application rather than indicating or implying that the means or components mentioned must have specific orientations or must be constructed or manipulated according to specific orientations, and therefore shall not be construed as any limitation on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in the embodiments of this application as suitable to specific situations.

When the temperature is low in winter, air conditioners are usually used in vehicles to raise the temperature of the internal space of the vehicles to achieve the effect of heating. However, at present, electric air conditioners with a heat pump function are mostly used for indoor heating of electric vehicles. Under low-temperature working conditions, heat pump air conditioning has problems such as low heat pump efficiency, which is difficult to meet the heating needs. At present, a general solution is to add an additional auxiliary heater to directly exchange heat with the heating heat exchanger in the internal space of a car, which requires higher specifications (such as the heating power and the volume) of the auxiliary heater.

Therefore, through numerous experiments, the inventor of this application found that specifications of an auxiliary heater can be effectively reduced by matching the auxiliary heater with a thermal management loop, and finally the technical solutions proposed in this application were obtained.

According to some embodiments of this application, refer to FIG. 1. FIG. 1 is a schematic block diagram of an embodiment of a thermal management system of a transportation device according to this application. As shown in FIG. 1, this application provides a thermal management system 1, including an air-conditioning system 10, a thermal management loop 20, and an auxiliary heater 30. The thermal management loop 20 is configured to circulate a first heat-conducting medium, so as to thermally manage a specified part of the transportation device. The thermal management loop 20 can further exchange heat with the air-conditioning system 10 to selectively transfer heat generated by the specified part to the air-conditioning system 10 when the air-conditioning system 10 is in a heating state, to provide at least a partial heat source for an evaporation process of the air-conditioning system. The auxiliary heater 30 is configured to selectively replenish heat for the thermal management loop 20.

The transportation device may be a device that can travel on traffic roads, waters or airspace, such as vehicles, ships, airplanes and other devices with air-conditioning systems.

The air-conditioning system 10 may be configured to cool, heat and/or dehumidify a specified region (for example, a passenger compartment) in the transportation device. In a case that the air-conditioning system 10 is configured to cool the specified region in the transportation device, it can be considered that the air-conditioning system 10 is in a refrigeration state. In a case that the air-conditioning system 10 is configured to heat a specified region in the transportation device, it can be considered that the air-conditioning system 10 is in a heating state. In a case that the air-conditioning system 10 is configured to dehumidify a region in the transportation device, it can be considered that the air-conditioning system 10 is in a dehumidification state. Optionally, the air-conditioning system 10 may include several modules, which cooperate with each other to cool, heat, and/or dehumidify a region in the transportation device.

The first heat-conducting medium may be any medium capable of conducting heat. For example, the first heat-conducting medium may be water, ethylene glycol, heat conduction oil, nanofluid, or the like. A specific form of the first heat-conducting medium is not limited herein.

The thermal management loop 20 is a path for circulating the first heat-conducting medium. The specified part may be any part that needs thermal management. The thermal management may be heating or heat dissipation. To be specific, the thermal management loop 20 can realize heating or heat dissipation of the specified part by circulating the first heat-conducting medium. For example, in a case that the temperature of the first heat-conducting medium is higher than the temperature of the specified part, the specified part can be heated; and in a case that the temperature of the first heat-conducting medium is lower than the temperature of the specified part, heat can be dissipated from the specified part. The thermal management loop 20 performs heat exchange with the air-conditioning system 10. In a case that the temperature of the first heat-conducting medium in the thermal management loop 20 is higher than the temperature of a heat exchange zone of the air-conditioning system 10, the air-conditioning system 10 can absorb heat from the first heat-conducting medium, thereby realizing heat exchange with the air-conditioning system 10. A working principle of the air-conditioning system 10 is to realize heat transfer through cooperation of evaporation heat absorption and condensation heat release. When the air-conditioning system 10 is in the heating state and the specified part is in a heating state, the first heat-conducting medium in the thermal management loop 20 transfers heat absorbed from the specified part to the air-conditioning system 10 through heat exchange, so as to use the heat as a low-temperature heat source in an evaporation process of the air-conditioning system 10, thereby realizing heat recycling. Optionally, the thermal management loop 20 may include a water pump, such as a water pump b1 and a water pump b2 in FIG. 1. The water pump b1 and the water pump b2 can be configured to promote circulation of the first heat-conducting medium in the thermal management loop 20.

The auxiliary heater 30 may be any part capable of generating heat, such as a PTC electric heater, a heating pipe, or the like. The first heat-conducting medium in the thermal management loop 20 absorbs heat from the auxiliary heater 30, and can heat the specified part and/or exchange heat with the air-conditioning system 10.

The specified part may be a battery module 41 and/or a motor module 42 in FIG. 1. In other embodiments, the specified part may be any other part that requires thermal management (heating or heat dissipation), and a specific type of the specified part is not specifically limited herein.

In the foregoing solution, the auxiliary heater 30 is disposed in the thermal management loop 20, so that the auxiliary heater 30 can replenish heat for the thermal management loop 20 and the air-conditioning system 10 can effectively absorb heat from the thermal management loop 20 under low-temperature and other working conditions, thereby reducing pressure of the air-conditioning system 10 and improving the heating effect of the air-conditioning system 10. In addition, the heating temperature of the auxiliary heater 30 only needs to ensure that the air-conditioning system 10 can absorb heat effectively, only part of heat supplied by the air-conditioning system 10 comes from the auxiliary heater 30, and the other part comes from the compression work inside the air-conditioning system 10. Therefore, specifications of the auxiliary heater 30 can be effectively reduced, a space utilization rate can be improved, and costs can be reduced.

As shown in FIG. 1, in some embodiments, the thermal management system 1 further includes a control module 21. The control module 21 controls, in response to the heat generated by the specified part not meeting a heat supply demand of the air-conditioning system 10, the auxiliary heater 30 to replenish heat for the thermal management loop 20.

The control module 21 may include an air conditioner controller. For example, the control module 21 may be a control line including the air conditioner controller. The control module 21 is connected to the auxiliary heater 30, and is configured to control the auxiliary heater 30 to replenish heat for the thermal management loop 20 or stop replenishing heat for the thermal management loop 20. Due to a limitation by the working principle of the air-conditioning system 10, it is difficult for the air-conditioning system 10 to absorb heat in a low-temperature environment (for example, below −10 degrees Celsius). Therefore, when the heat generated by the specified part does not meet the heat supply demand of the air-conditioning system 10, the air-conditioning system 10 still cannot absorb heat from the first heat-conducting medium after the first heat-conducting medium is heated by the heat generated by the specified part. There is a difficulty in supporting the heat supply demand of the air-conditioning system 10.

In the foregoing solution, the control module 21 is used to control, based on the heat supply demand of the air-conditioning system 10, the auxiliary heater 30 to replenish heat for the thermal management loop 20, so that the air-conditioning system 10 can effectively absorb heat from the thermal management loop 20, thereby realizing automatic control. In some application scenarios, the auxiliary heater 30 may be manually turned on or off by a user to replenish heat for the thermal management loop 20 or stop replenishing heat for the thermal management loop 20. For example, the control module 21 generates prompt information after determining that the heat generated by the specified part does not meet the heat supply demand of the air-conditioning system, and the user can choose whether to manually turn on the auxiliary heater 30. Alternatively, the user can decide whether to manually turn on the auxiliary heater 30 according to his/her own judgment.

In some embodiments, the thermal management system 1 includes a detection module 22. The detection module 22 is configured to detect an operating state or an operating environment of the air-conditioning system 10 when the air-conditioning system 10 is in the heating state. Based on a detection result of the detection module 22, the control module 21 determines whether the heat generated by the specified part meets the heat supply demand of the air-conditioning system 10. The operating state is a state of the air-conditioning system 10 during operation, such as the temperature or pressure of a refrigerant, a condenser, or an evaporator. The operating environment is an external environment in which the air-conditioning system 10 is operating, such as the ambient temperature, the temperature of the first heat-conducting medium, or the like. In some application scenarios, whether the heat generated by the specified part meets the heat supply demand of the air-conditioning system 10 can be determined based on the temperature of the first heat-conducting medium.

The detection module 22 is connected to the control module 21, and is configured to transmit the detection result to the control module 21, so that the control module 21 can determine, based on the detection result, whether the heat generated by the specified part meets the heat supply demand of the air-conditioning system 10.

In the foregoing solution, the detection module 22 detects the operating state or the operating environment of the air-conditioning system 10, to determine whether the heat generated by the specified part meets the heat supply demand of the air-conditioning system 10, thereby realizing automatic control.

In some embodiments, the operating environment includes the temperature of the first heat-conducting medium. The detection module 22 is configured to detect the temperature of the first heat-conducting medium before heat exchange between the first heat-conducting medium and the air-conditioning system 10. In response to the temperature detected by the detection module 22 being lower than a preset temperature threshold, the control module 21 determines that the heat generated by the specified part does not meet the heat supply demand of the air-conditioning system 10.

The detection module 22 may be any temperature sensor with a temperature detection function, such as a thermocouple. A specific disposing manner may be that the first heat-conducting medium flows through the detection module 22 first, and then flows through a region in which the first heat-conducting medium exchanges heat with the air-conditioning system 10, so that the detection module 22 can detect the temperature of the first heat-conducting medium before the first heat-conducting medium exchanges heat with the air-conditioning system 10. Because the air-conditioning system 10 absorbs heat from the first heat-conducting medium, the temperature of the first heat-conducting medium will drop after the heat exchange. Therefore, whether the heat generated by the specified part meets the heat supply demand of the air-conditioning system 10 can be more accurately determined through the temperature detection of the first heat-conducting medium before the heat exchange between the first heat-conducting medium and the air-conditioning system 10.

The preset temperature threshold can be customized by the user or specified in advance according to experiments or experiences. It can be considered that if the temperature of the first heat-conducting medium is lower than the preset temperature threshold, the heat absorbed by the air-conditioning system 10 from the first heat-conducting medium cannot meet a current heat supply demand of the air conditioning system. Therefore, the control module 21 controls the auxiliary heater 30 to replenish heat for the thermal management loop 20.

In the foregoing solution, the temperature of the first heat-conducting medium is detected before the heat exchange between the first heat-conducting medium and the air-conditioning system 10 to determine that the heat generated by the specified part does not meet the heat supply demand of the air-conditioning system 10. The detection method is relatively simple and a detection result is more accurate.

In some embodiments, the control module 21 is further capable of controlling, in response to a heat supply demand of the specified part itself, the auxiliary heater 30 to replenish heat for the thermal management loop 20, so as to heat the specified part through the first heat-conducting medium.

Specifically, many apparatuses cannot work normally or their working efficiency becomes poor in a low-temperature environment. For example, output power of the battery module 41 is reduced in a low-temperature state. In some application scenarios, the heat supply demand of the specified part itself may be that the temperature of the specified part is lower than a preset temperature value or output power or other working performance of the specified part is lower than a preset power requirement or a performance requirement, and it is needed to provide output power or improve other working performance by heating.

In the foregoing solution, it is beneficial to maintain a normal working state of the specified part by controlling the auxiliary heater 30 to replenish heat for the thermal management loop 20 under a condition that the specified part has its own heat supply demand.

In some embodiments, the thermal management loop 20 includes a main heat exchange zone 231 for exchanging heat with the specified part and an auxiliary heat exchange zone 24 for exchanging heat with the auxiliary heater 30. The thermal management loop 20 further includes a flow distribution component 261 and a bypass line 251 connected in parallel with the main heat exchange zone 231. The control module 21 controls, based on the heat supply demand of the specified part and the heat supply demand of the air-conditioning system 10, the flow distribution component 261 to perform flow distribution on the first heat-conducting medium between the main heat exchange zone 231 and the bypass line 251.

The main heat exchange zone 231 and the auxiliary heater 30 may be part of a pipeline for the first heat-conducting medium to flow or a heat exchanger communicating with or exchanging heat with the pipeline, and are not limited herein. The specified part and the auxiliary heater 30 can exchange heat with the main heat exchange zone 231 and the auxiliary heater 30 through direct contact, or can exchange heat with the main heat exchange zone 231 and the auxiliary heater 30 by other indirect means. This is not limited herein. The flow distribution component 261 may be implemented by a three-way proportional valve or any other valve component or another element. This is not limited herein.

The bypass line 251 typically refers to a branch that enables the first heat-conducting medium in the upstream of the main heat exchange zone 231 to reach the downstream of the main heat exchange zone 231 without flowing through the main heat exchange zone 231. Further, a capacity of heat exchange between the bypass line 251 and the specified part is smaller than a capacity of heat exchange between the main heat exchange zone 231 and the specified part. In other words, an amount of heat exchanged per unit time between the specified part and a first heat-conducting medium per unit volume flowing through the bypass line 251 is smaller than an amount of heat exchanged per unit time between the specified part and a first heat-conducting medium per unit volume flowing through the main heat exchange zone 231.

In a specific implementation process, a flow capacity of the first heat-conducting medium between the main heat exchange zone 231 and the bypass line 251 can be adjusted based on a preset priority relationship between the heat supply demand of the specified part and the heat supply demand of the air-conditioning system 10 or a size relationship between the heat supply demand of the specified part and the heat supply demand of the air-conditioning system 10. In some application scenarios, a flow adjustment mode of the first heat-conducting medium in the main heat exchange zone 231 and the bypass line 251 can be preset when both the specified part and the air-conditioning system 10 have heat supply demands. In some application scenarios, in response to the heat supply demand of the specified part being greater than the heat supply demand of the air-conditioning system 10, the heat supply demand of the specified part can be met by adjusting the first heat-conducting medium between the main heat exchange zone 231 and the bypass line 251; or in response to the heat supply demand of the specified part being less than or equal to the heat supply demand of the air-conditioning system 10, the heat supply demand of the air-conditioning system 10 can be met by adjusting the first heat-conducting medium between the main heat exchange zone 231 and the bypass line 251.

A specific manner of flow distribution may be controlling the first heat-conducting medium to flow only through the main heat exchange zone 231 or only through the bypass line 251, or controlling a flow capacity of the first heat-conducting medium flowing through both of the two lines.

In the foregoing solution, the flow distribution component 261 performs flow distribution on the first heat-conducting medium between the main heat exchange zone 231 and the bypass line 251, so as to adjust heat distribution supplied to the specified part and the air-conditioning system 10 based on different working conditions.

In some embodiments, as shown in FIG. 1, the first heat-conducting medium flows to the main heat exchange zone 231 and the bypass line 251 after being heated by the auxiliary heat exchange zone 24, and exchanges heat with the air-conditioning system 10 before entering the auxiliary heat exchange zone 24. In other embodiments, another arrangement manner may alternatively be used. For example, the first heat-conducting medium heated by the auxiliary heat exchange zone 24 flows to the main heat exchange zone 231 and the bypass line 251 after exchanging heat with the air-conditioning system 10, and is heated by the auxiliary heat exchange zone 24 after flowing through the main heat exchange zone 231 and/or the bypass line 251.

A position of the flow distribution component 261 can be set according to an actual situation, for example, at a parallel shunt position of the main heat exchange zone 231 and the bypass line 251, or at a parallel confluence position of the main heat exchange zone 231 and the bypass line 251. In some application scenarios, a plurality of flow distribution components 261 may be provided, and a method other than the three-way proportional valve may be used. For example, a flow distribution component 261 is arranged on a branch in which the main heat exchange zone 231 is located to control a flow capacity of the first heat-conducting medium flowing through the main heat exchange zone 231, and/or a flow distribution component 261 is arranged on the bypass line 251 to control a flow capacity of the first heat-conducting medium flowing through the bypass line 251.

In the foregoing solution, effects of heat distribution between the specified part and the air-conditioning system 10 can be further improved by optimizing a disposing position of the auxiliary heat exchange zone 24.

In some embodiments, the specified part is the battery module 41 of the transportation device. When both the battery module 41 and the air-conditioning system 10 have heat supply demands, the control module 21 controls, in response to the output power of the battery module 41 not meeting an external power demand, the flow distribution component 261 to preferentially meet the heat supply demand of the battery module 41. Alternatively, in response to the output power of the battery module 41 being able to meet an external power demand, the flow distribution component 261 is controlled to preferentially meet the heat supply demand of the air-conditioning system 10 through the auxiliary heater 30.

The battery module 41 includes a plurality of battery packs, configured to provide electric energy for the transportation device. The output power of the battery module 41 not meeting the external power demand may be that the output power of the battery module 41 is less than input power required by an external load to which the battery module 41 is connected. For example, the external power demand includes a power demand of the air-conditioning system 10, a power demand of the motor module 42, and power demands of other parts. The other parts include any other parts that require electricity in the transportation device, such as a lighting system.

In the foregoing solution, under a condition that the output power of the battery module 41 does not meet the external power demand, the battery module 41 is preferentially heated to improve ensure normal operation of the transportation device.

In some embodiments, the preferentially meeting the heat supply demand of the battery module 41 is to supply all the first heat-conducting medium to the main heat exchange zone 231 or increase a flow capacity of the first heat-conducting medium flowing to the main heat exchange zone 231. The preferentially meeting the heat supply demand of the air-conditioning system 10 is to supply all the first heat-conducting medium to the bypass line 251 or increase a flow capacity of the first heat-conducting medium flowing to the bypass line 251.

Figure 2:
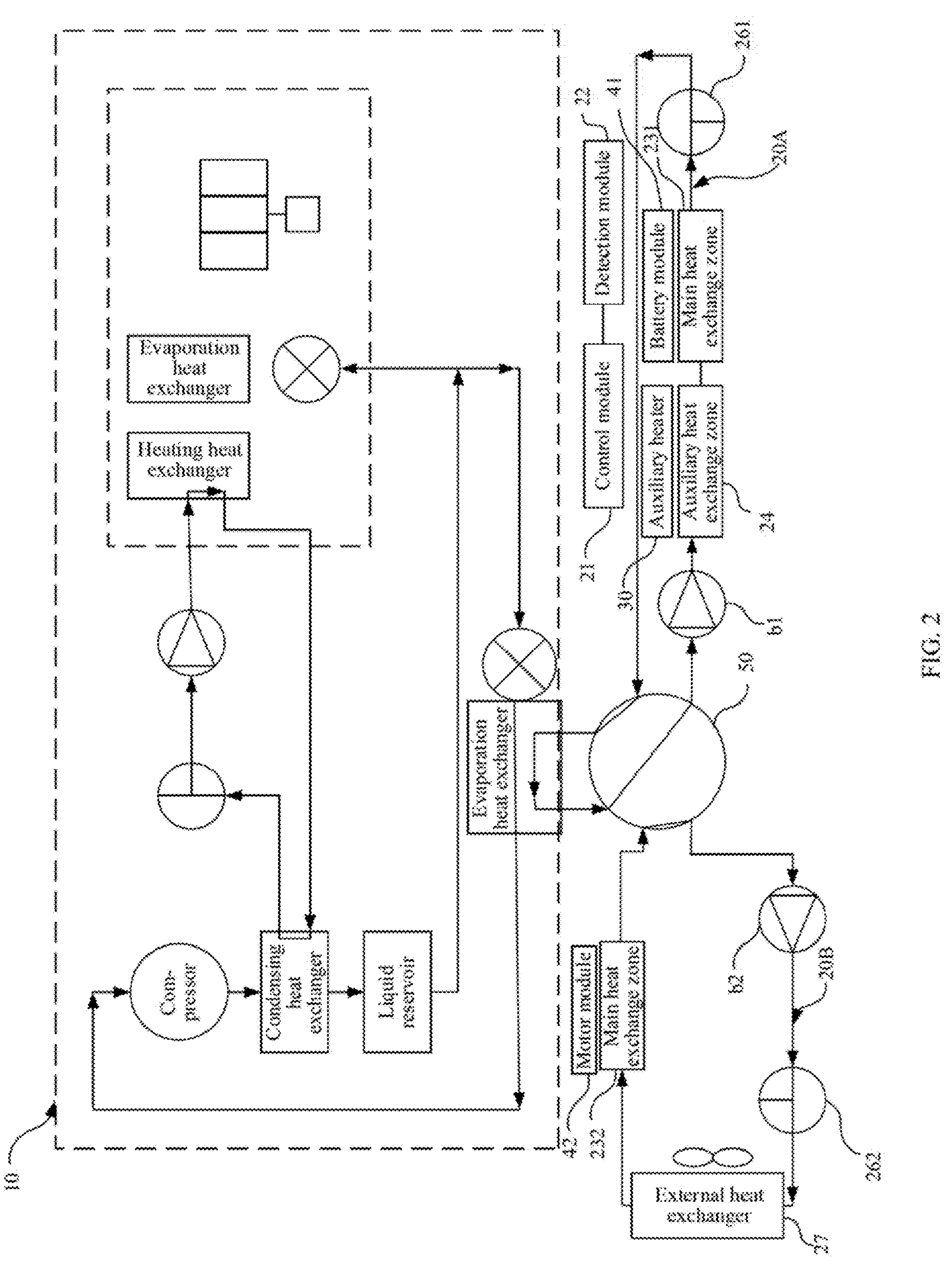
FIG. 2 is a schematic diagram of a working flow path of the thermal management system shown in FIG. 1 in a first working state.

As shown in FIG. 2, in some application scenarios, the preferentially meeting the heat supply demand of the battery module 41 is to supply all the first heat-conducting medium to the main heat exchange zone 231. To be specific, the control module 21 controls the flow distribution component 261 to disconnect the bypass line 251, so that there is no first heat-conducting medium flowing in the bypass line 251. Therefore, all the first heat-conducting medium flows through a line in which the main heat exchange zone 231 is located.

In some application scenarios, the preferentially meeting the heat supply demand of the battery module 41 is to increase the flow capacity of the first heat-conducting medium flowing to the main heat exchange zone 231. For example, the control module 21 controls the flow distribution component 261 to perform opening adjustment based on existing valve opening, to adjust a flow capacity of the first heat-conducting medium flowing through the main heat exchange zone 231 and the bypass line 251, so as to increase a flow capacity of the line in which the main heat exchange zone 231 is located and reduce a flow capacity of the bypass line 251.

Figure 3:
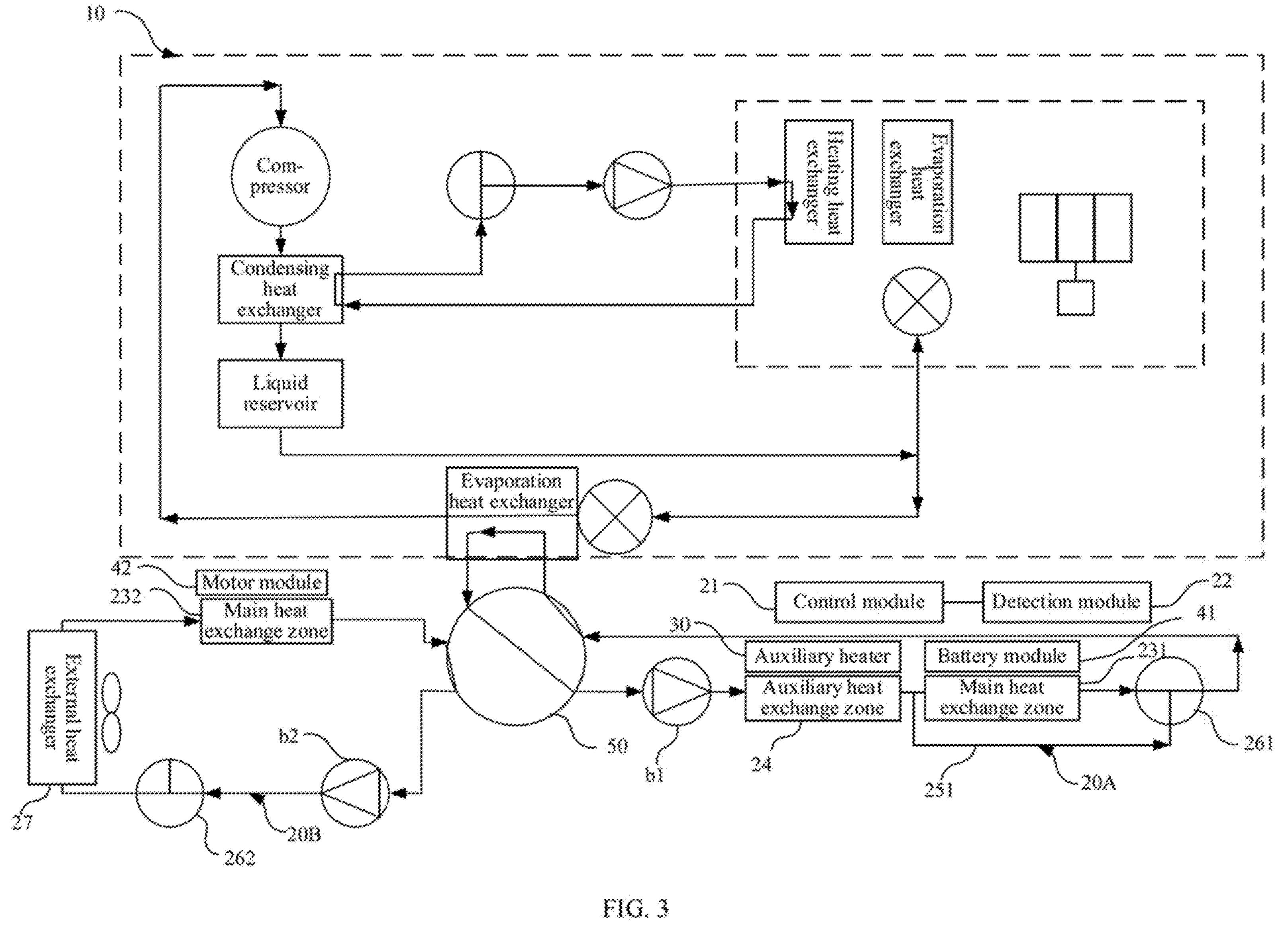
FIG. 3 is a schematic diagram of a working flow path of the thermal management system shown in FIG. 1 in a second working state.

As shown in FIG. 3, in some application scenarios, the preferentially meeting the heat supply demand of the air-conditioning system 10 is to supply all the first heat-conducting medium to the bypass line 251. To be specific, the control module 21 controls the flow distribution component 261 to disconnect the line in which the main heat exchange zone 231 is located, so that there is no first heat-conducting medium flowing in the line in which the main heat exchange zone 231 is located. Therefore, all the first heat-conducting medium flows through the bypass line 251.

In some application scenarios, the preferentially meeting the heat supply demand of the air-conditioning system 10 is to increase the flow capacity of the first heat-conducting medium flowing to the bypass line 251. For example, the control module 21 controls the flow distribution component 261 to perform opening adjustment based on existing valve opening, to adjust a flow capacity of the first heat-conducting medium flowing through the main heat exchange zone 231 and the bypass line 251, so as to increase a flow capacity of the first heat-conducting medium flowing to the bypass line 251 and reduce a flow capacity of the line in which the main heat exchange zone 231 is located.

In the foregoing solution, the battery module 41 can be heated better by supplying all the first heat-conducting medium to the main heat exchange zone 231 or increasing the flow capacity of the first heat-conducting medium flowing to the main heat exchange zone 231. The air-conditioning system 10 can better absorb heat from the thermal management loop 20 by supplying all the first heat-conducting medium to the bypass line 251 or increasing the flow capacity of the first heat-conducting medium flowing to the bypass line 251.

In some embodiments, the control module 21 is further capable of: after the heat supply demand of the air-conditioning system 10 is preferentially met, controlling, in response to the thermal management loop 20 meeting the heat supply demand of the air-conditioning system 10, the flow distribution component 261 to reduce the flow capacity of the first heat-conducting medium flowing to the bypass line 251 and increase the flow capacity of the first heat-conducting medium flowing to the main heat exchange zone 231. In addition, the control module is further capable of controlling, in response to the thermal management loop 20 not meeting the heat supply demand of the air-conditioning system 10, the flow distribution component 261 to increase the flow capacity of the first heat-conducting medium flowing to the bypass line 251 and reduce the flow capacity of the first heat-conducting medium flowing to the main heat exchange zone 231.

In some application scenarios, whether the thermal management loop 20 meets the heat supply demand of the air-conditioning system 10 can be determined by the temperature of the first heat-conducting medium before or after the heat exchange with the air-conditioning system 10. For example, when the temperature is greater than a first threshold, it is considered that the thermal management loop 20 meets the heat supply demand of the air-conditioning system 10; and when the temperature is less than a second threshold, it is considered that the thermal management loop 20 does not meet the heat supply demand of the air-conditioning system 10. In addition, as described above, the operating state or the operating environment of the air-conditioning system 10 can be detected in other ways to determine whether the thermal management loop 20 meets the heat supply demand of the air-conditioning system 10.

In the foregoing solution, the heat supply demands of the air-conditioning system 10 and the battery module 41 are dynamically balanced through dynamic flow distribution.

In some embodiments, the thermal management loop 20 includes at least two thermal management sub-loops, for example, a thermal management sub-loop 20A and a thermal management sub-loop 20B in FIG. 1. The at least two thermal management sub-loops are both configured to circulate the first heat-conducting medium and perform thermal management on different specified parts. The thermal management system 1 further includes a thermal management switching component 50. The control module 21 controls the thermal management switching component 50 to selectively switch a heat exchange relationship between the at least two thermal management sub-loops and the air-conditioning system 10. Each thermal management sub-loop may perform thermal management on one or more specified parts.

The thermal management switching component 50 may be a multi-way valve. That the control module 21 controls the thermal management switching component 50 to selectively switch the heat exchange between the at least two thermal management sub-loops and the air-conditioning system 10 may be: The control module 21 controls part of the thermal management sub-loops to exchange heat with the air-conditioning system 10, or controls all thermal management sub-loops to exchange heat with the air-conditioning system 10.

In the foregoing solution, different thermal management sub-loop combinations can be used to provide heat to the air-conditioning system 10 based on different working conditions by selectively switching the heat exchange relationship between the at least two thermal management sub-loops and the air-conditioning system 10.

As shown in FIG. 1, in some embodiments, the specified part includes the battery module 41 and the motor module 42 of the transportation device. The at least two thermal management sub-loops include the thermal management sub-loop 20A and the thermal management sub-loop 20B. The thermal management sub-loop 20A is configured to perform thermal management on the battery module 41, and includes the main heat exchange zone 231 for heat exchange with the battery module 41 and the auxiliary heat exchange zone 24 for heat exchange with the auxiliary heater 30. The thermal management sub-loop 20B is configured to perform thermal management on the motor module 42, and includes a main heat exchange zone 232 for heat exchange with the motor module 42 and an external heat exchanger 27 for heat exchange with an external environment. The control module 21 controls, in response to the air-conditioning system 10 being in the heating state, the thermal management switching component 50 to switch at least one of the thermal management sub-loop 20A and the thermal management sub-loop 20B to exchanging heat with the air-conditioning system 10.

The thermal management loop 20 may include other thermal management sub-loops besides the thermal management sub-loop 20A and the thermal management sub-loop 20B, for thermal management of other specified parts in the transportation device. The external heat exchanger 27 may be a device such as a radiator that can be used for heat exchange with the external environment.

As shown in FIG. 2 and FIG. 3, in some application scenarios, for example, when the battery module 41 is in a charging state and therefore has a large amount of heat, the control module 21 controls, in response to the air-conditioning system 10 being in the heating state, the thermal management switching component 50 to switch the thermal management sub-loop 20A to exchanging heat with the air-conditioning system 10, so that heat generated by the battery module 41 can be used as a low-temperature heat source of the air-conditioning system 10. In addition, alternatively, the thermal management sub-loop 20A may be switched to exchanging heat with the air-conditioning system 10 under low-temperature working conditions. In this case, the auxiliary heater 30 can be used to meet the heat supply demand of the air-conditioning system 10, and can further meet the heat supply demand of the battery module 41 when the battery module 41 has a heat supply demand.

Figure 4:
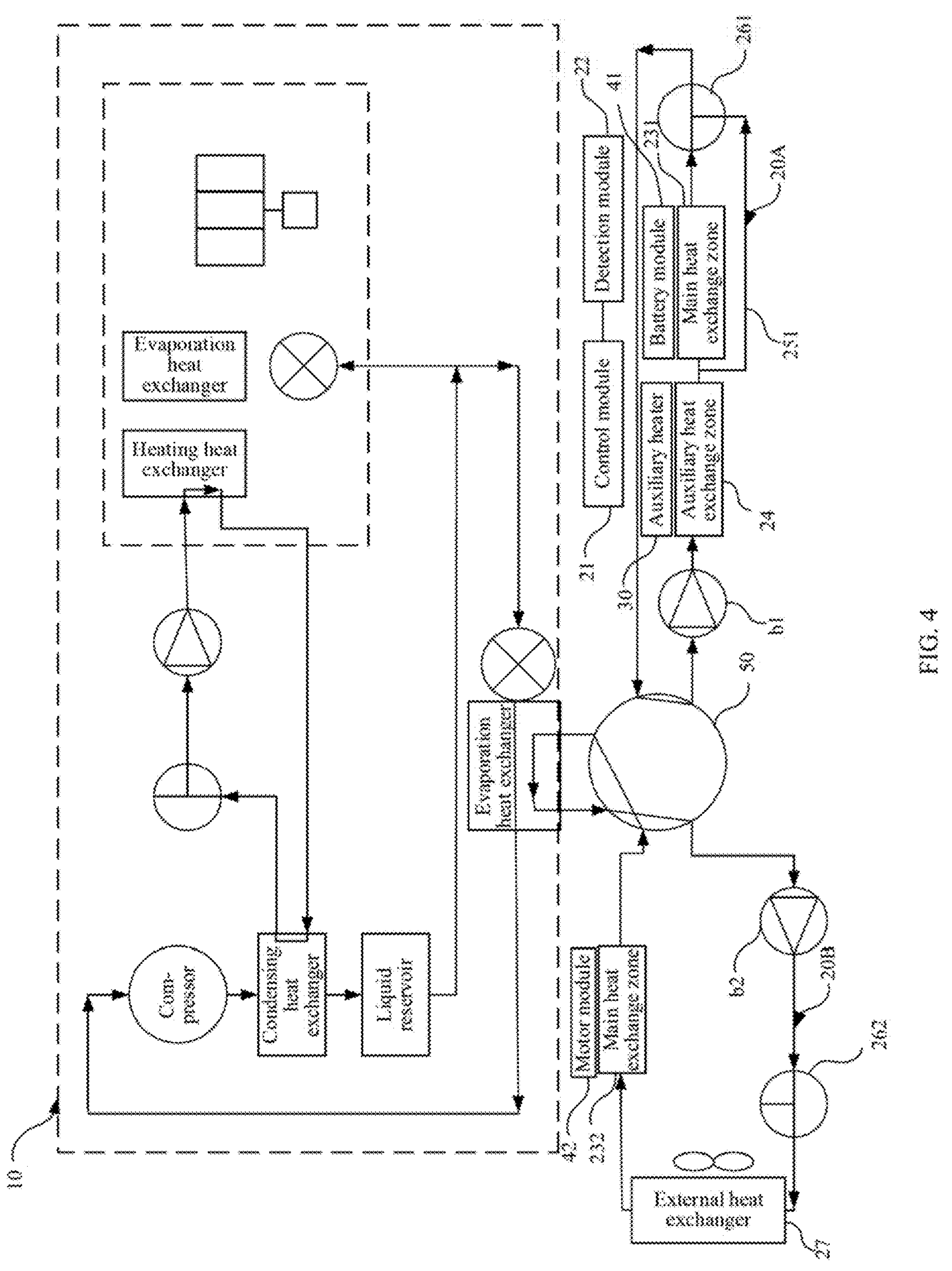
FIG. 4 is a schematic diagram of a working flow path of the thermal management system shown in FIG. 1 in a third working state.
Figure 5:
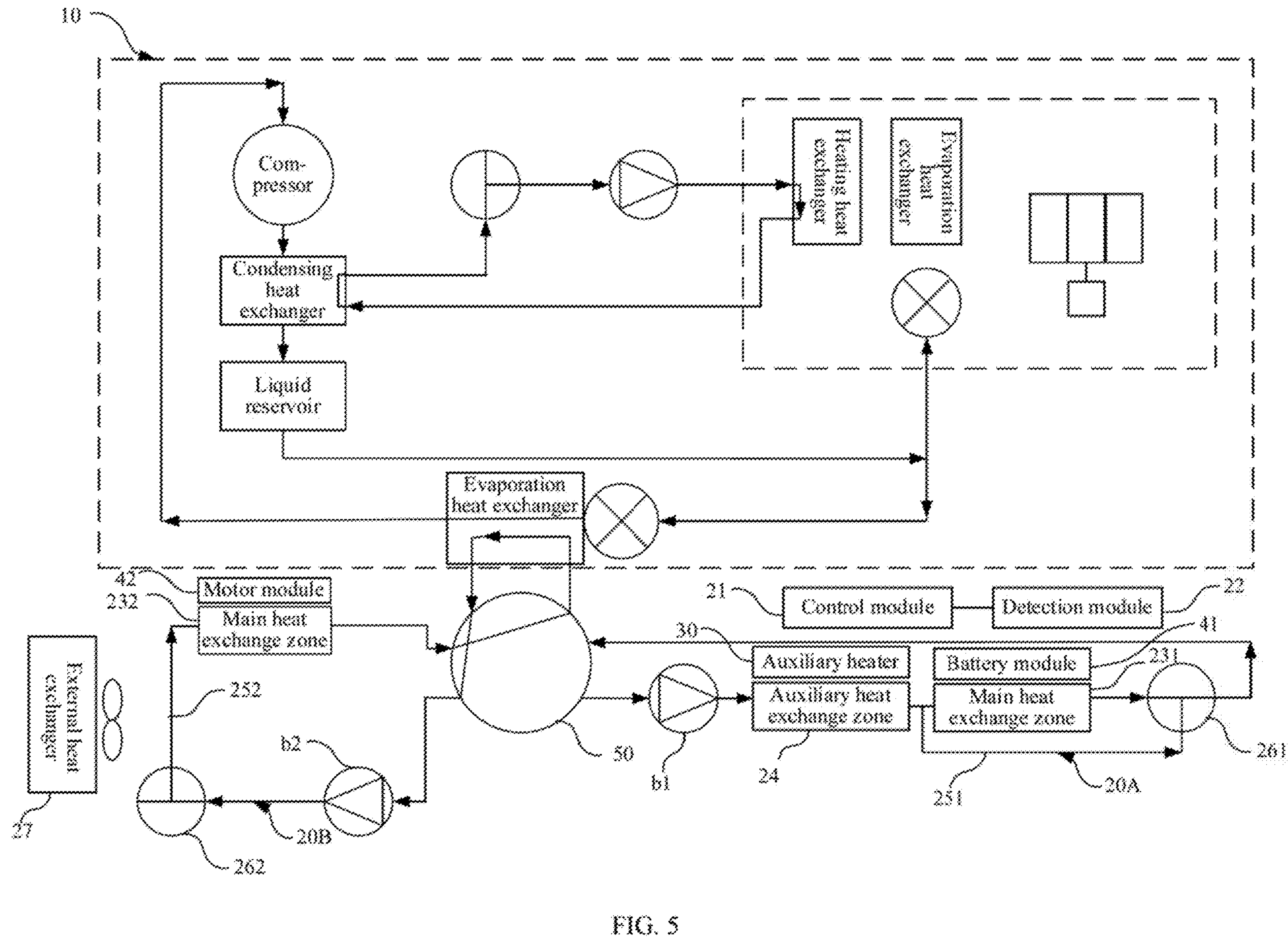
FIG. 5 is a schematic diagram of a working flow path of the thermal management system shown in FIG. 1 in a fourth working state.

As shown in FIG. 4 and FIG. 5, in some application scenarios, for example, when the motor module 42 generates a large amount of heat during traveling of the transportation device, the control module 21 controls, in response to the air-conditioning system 10 being in the heating state, the thermal management switching component 50 to switch the thermal management sub-loop 20B to exchanging heat with the air-conditioning system 10, so that heat generated by the motor module 42 can be used as a low-temperature heat source of the air-conditioning system 10.

Alternatively, when the thermal management sub-loop 20A exchanges heat with the air-conditioning system 10, and the thermal management sub-loop 20B does not exchange heat with the air-conditioning system 10, the thermal management switching component 50 controls the first heat-conducting medium in the thermal management sub-loop 20B to be in self-circulation. That is, the first heat-conducting medium circulates in the thermal management sub-loop 20B, so that thermal management such as heat dissipation or heating can be independently performed on the motor module 42.

Alternatively, when the thermal management sub-loop 20B exchanges heat with the air-conditioning system 10, and the thermal management sub-loop 20A does not exchange heat with the air-conditioning system 10, the thermal management switching component 50 controls the first heat-conducting medium in the thermal management sub-loop 20A to be in self-circulation. That is, the first heat-conducting medium circulates in the thermal management sub-loop 20A, so that thermal management such as heat dissipation or heating can be performed on the battery module 41. Optionally, when the battery module 41 has a heat supply demand, the control module 21 controls the auxiliary heater 30 to replenish heat for the first heat-conducting medium in the thermal management sub-loop 20A.

In the foregoing solution, two main heat sources (the battery module 41 and the motor module 42) of the transportation device are thermally managed through two thermal management sub-loops, so that a heat recovery utilization rate can be improved. Meanwhile, the auxiliary heater 30 is disposed in a thermal management sub-loop 20A in which the battery module 41 is located, so that the battery module 41 can be selectively heated by using a heating function of the auxiliary heater 30, thereby improving the low-temperature starting performance of the transportation device.

Figure 6:
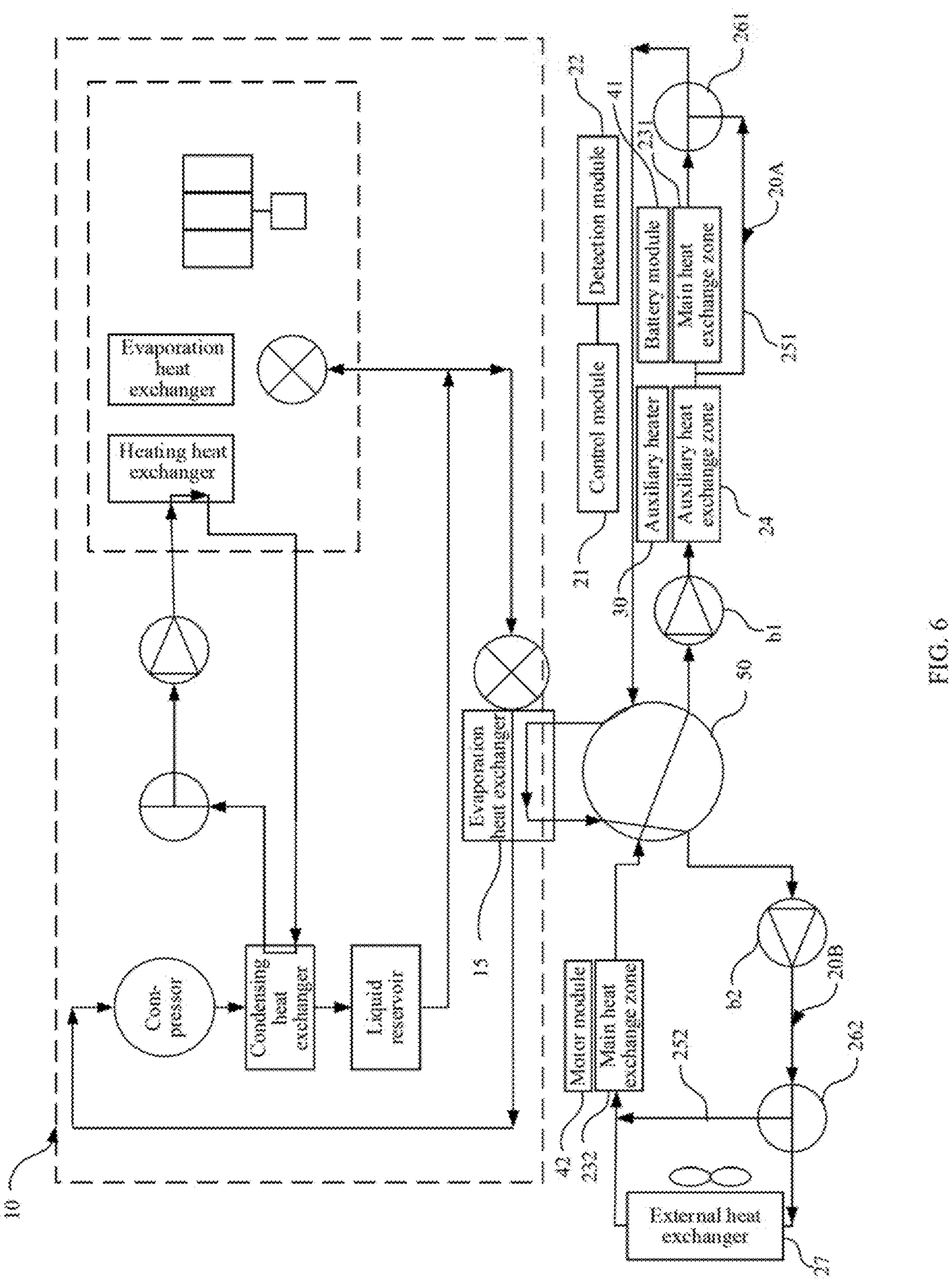
FIG. 6 is a schematic diagram of a working flow path of the thermal management system shown in FIG. 1 in a fifth working state.

As shown in FIG. 6, in some embodiments, for example, when both the battery module 41 and the motor module 42 have a large amount of generated heat or under other working conditions, the control module 21 can further control, in response to the air-conditioning system 10 being in the heating state, the thermal management switching component 50 to switch the thermal management sub-loop 20A and the thermal management sub-loop 20B to simultaneously exchanging heat with the air-conditioning system 10.

In the foregoing solution, the thermal management sub-loop 20A and the thermal management sub-loop 20B are switched to simultaneously exchanging heat with the air-conditioning system 10, so that it is convenient to simultaneously perform thermal management on specified parts in the two thermal management sub-loops, and the heat recovery utilization rate can also be improved.

As further shown in FIG. 6, in some embodiments, the control module 21 can further control the thermal management switching component 50 to connect the thermal management sub-loop 20A and the thermal management sub-loop 20B, so that the first heat-conducting medium circulates in an entire loop formed by the thermal management sub-loop 20A and the thermal management sub-loop 20B.

In the foregoing solution, heat balance can be ensured and the thermal management effect can be improved by switching the thermal management sub-loop 20A and the thermal management sub-loop 20B to communicating with each other. For example, the battery module 41 is heated by the heat generated by the motor module 42.

In some embodiments, the thermal management sub-loop 20A includes the flow distribution component 261 and the bypass line 251 connected in parallel with the main heat exchange zone 231. The control module 21 controls, based on the heat supply demand of the battery module 41 and the heat supply demand of the air-conditioning system 10, the flow distribution component 261 to perform flow distribution on the first heat-conducting medium in the thermal management sub-loop 20A between the main heat exchange zone 231 and the bypass line 251. A specific working process is described above in detail with reference to FIG. 1 to FIG. 3. Details are not described herein again. It should be noted that the foregoing flow distribution performed by the flow distribution component 261 may occur in a state shown in FIG. 6.

As shown in FIG. 1, in some embodiments, the thermal management sub-loop 20B includes a flow distribution component 262 and a bypass line 252 connected in parallel with the external heat exchanger 27. The control module 21 controls the flow distribution component 262 to perform flow distribution on a first heat-conducting medium in the thermal management sub-loop 20B between the external heat exchanger 27 and the bypass line 252 based on a heat dissipation demand of the motor module 42, the heat supply demand of the air-conditioning system 10, or the external environment of the external heat exchanger 27.

In the foregoing solution, the heat dissipation demand of the motor module 42 and/or the heat supply demand of the air-conditioning system can be dynamically met by performing flow distribution on the first heat-conducting medium in the thermal management sub-loop 20B between the external heat exchanger 27 and the bypass line 252.

In some embodiments, in response to the motor module 42 having no additional heat dissipation demand after supplying heat to the air-conditioning system 10 or the motor module 42 not meeting the heat supply demand of the air-conditioning system 10 and being incapable of absorbing heat from the environment through the external heat exchanger 27, the control module 21 introduces all the first heat-conducting medium in the thermal management sub-loop 20B into the bypass line 252 or increases the flow capacity of the first heat-conducting medium flowing to the bypass line 252. Alternatively, in response to the motor module 42 still having an additional heat dissipation demand after supplying heat to the air-conditioning system 10 or the motor module 42 not meeting the heat supply demand of the air-conditioning system 10 and being capable of absorbing heat from the environment through the external heat exchanger 27, the control module introduces all the first heat-conducting medium in the thermal management sub-loop 20B into the external heat exchanger 27 or increases the flow capacity of the first heat-conducting medium flowing to the external heat exchanger 27.

As shown in FIG. 4, in some application scenarios, the control module 21 controls the flow distribution component 262 to disconnect the bypass line 252, so that there is no first heat-conducting medium flowing in the bypass line 252. Therefore, all the first heat-conducting medium flows through a line in which the external heat exchanger 27 is located.

As shown in FIG. 5, in some application scenarios, the control module 21 controls the flow distribution component 262 to disconnect the line in which the external heat exchanger 27 is located, so that there is no first heat-conducting medium flowing in the line in which the external heat exchanger 27 is located. Therefore, all the first heat-conducting medium flows through the bypass line 252.

In some application scenarios, similar to the flow distribution component 261 described above, it is also possible to increase or reduce, through the flow distribution component 262, a flow capacity of the first heat-conducting medium flowing to the bypass line 252 and the external heat exchanger 27 in a case that the first heat-conducting medium flows through both the bypass line 252 and the external heat exchanger 27.

Similarly, the flow distribution component 262 may be implemented by a three-way proportional valve or any other valve component or another element. This is not limited herein.

Whether the motor module 42 has an additional heat dissipation demand after supplying heat to the air-conditioning system 10 typically means whether the motor module 42 can work normally or whether its working efficiency is affected without additional heat dissipation. This can be determined by the temperature of the motor module 42 itself, the temperature of the first heat-conducting medium, or the working performance of the motor module 42. Whether the motor module 42 can meet the heat supply demand of the air-conditioning system 10 typically means whether the heat absorbed by the air-conditioning system 10 from the thermal management sub-loop 20B can meet the heating requirement. As described above, this can be determined by the operating state or the operating environment of the air-conditioning system 10. Whether the external heat exchanger 27 can absorb heat from the environment can be determined by the temperature in the external environment or a temperature difference between the temperature in the external environment and the temperature of the first heat-conducting medium. It should be noted that the foregoing flow distribution performed by the flow distribution component 262 may occur in a state shown in FIG. 6.

In the foregoing solution, the heat dissipation demand of the motor module 42 and the heat supply demand of the air-conditioning system 10 can be dynamically balanced based on actual working conditions of the motor module 42 and the air-conditioning system 10. In addition, an additional heat loss can be avoided when the external heat exchanger 27 cannot absorb heat from the environment, and heat supply to the air-conditioning system 10 can be increased when the external heat exchanger 27 can absorb heat from the environment.

As shown in FIG. 1, in some embodiments, the air-conditioning system 10 includes an air-conditioning loop 10A and an air-conditioning loop 10B. The air-conditioning loop 10A is configured to circulate a refrigerant and includes a compressor 11, a condensing heat exchanger 12, a liquid reservoir 13, and evaporation heat exchangers 14 and 15. The refrigerant absorbs heat by evaporation in the evaporation heat exchanger 14, to cool the specified region of the transportation device by air conditioning. The refrigerant absorbs heat by evaporation in the evaporation heat exchanger 15, to absorb heat from the thermal management loop 20. The air-conditioning loop 10B is configured to circulate a second heat-conducting medium, and includes a heating heat exchanger 16, where the heating heat exchanger 16 exchanges heat with the condensing heat exchanger 12, to heat the specified region by air conditioning.

Specifically, the compressor 11 compresses the refrigerant into high-temperature and high-pressure gas and inputs the gas to the condensing heat exchanger 12. The refrigerant is condensed by the condensing heat exchanger 12 and heat is released, to form a high-temperature and high-pressure liquid, which is stored in the liquid reservoir 13. The refrigerant in the liquid reservoir 13 enters the evaporation heat exchanger 14 and the evaporation heat exchanger 15 after throttling. Functions of the evaporation heat exchangers 14 and 15 may be: Based on a characteristic of a liquid refrigerant that evaporates easily at low pressure, the liquid refrigerant is converted into vapor and heat of a cooled medium is absorbed, to achieve a purpose of heat exchange.

The condensing heat exchanger 12 and the evaporation heat exchanger 15 adopt plate heat exchangers. The plate heat exchanger is provided with two flow paths, one for the refrigerant to flow and the other for the first heat-conducting medium or the second heat-conducting medium to flow, thereby realizing heat exchange between the refrigerant and the first heat-conducting medium or the second heat-conducting medium. The refrigerant absorbs heat by evaporation in the evaporation heat exchanger 15, so as to realize heat exchange with the first heat-conducting medium in the thermal management loop 20. A specific heat exchange mode may be any one shown in FIG. 2 to FIG. 6. The refrigerant absorbs heat by evaporation in the evaporation heat exchanger 14, so as to absorb heat from the specified region in the transportation device, thereby achieving a purpose of cooling by air conditioning.

The heating heat exchanger 16 may be a warm air core, and the heating heat exchanger 16 and the condensing heat exchanger 12 exchange heat through the second heat-conducting medium, so that the specified region in the transportation device can be heated. Optionally, a water pump b3 may be arranged in the air-conditioning loop 10B, and the water pump b3 may be configured to promote circulation of the second heat-conducting medium in the air-conditioning loop 10B.

In the foregoing solution, air-conditioning heating is realized through heat exchange between the heating heat exchanger 16 and the condensing heat exchanger 12. This can simplify a flow path design of the air-conditioning system.

Figure 7:
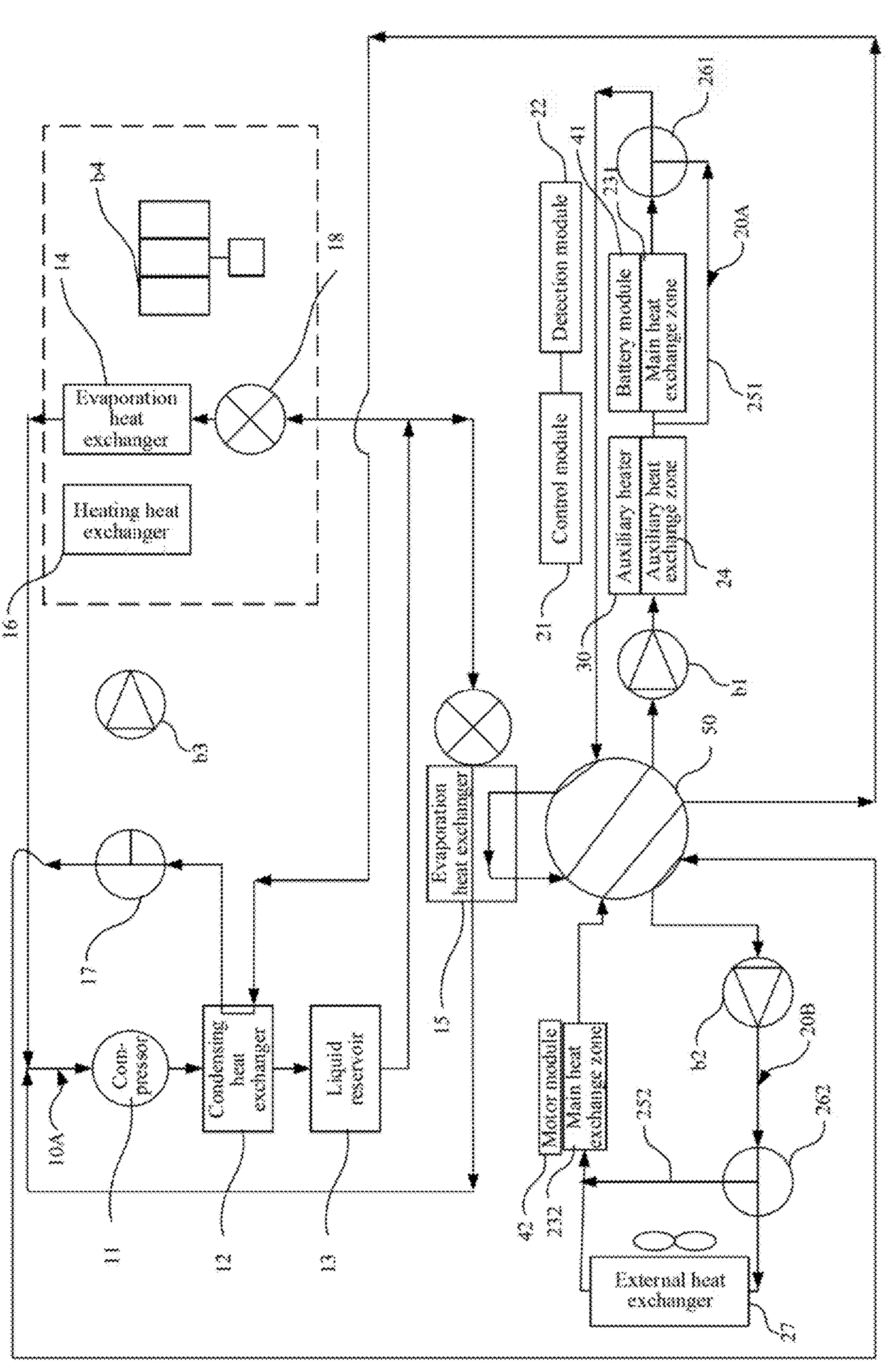
FIG. 7 is a schematic diagram of a working flow path of the thermal management system shown in FIG. 1 in a sixth working state.

As shown in FIG. 7, in some embodiments, the control module 21 is further capable of controlling, in response to the air-conditioning system 10 being in a refrigeration state, the thermal management switching component 50 to switch the thermal management sub-loop 20B to exchanging heat with the condensing heat exchanger 12, to transfer heat released by the condensing heat exchanger 12 to the external heat exchanger 27.

The thermal management sub-loop 20B includes the external heat exchanger 27, and the external heat exchanger 27 has a strong heat exchange capability with the external environment. Switching the thermal management sub-loop 20B to exchanging heat with the condensing heat exchanger 12 can make the heat released by the condensing heat exchanger 12 be absorbed by the first heat-conducting medium and then dissipated to the external environment through the external heat exchanger 27.

In the foregoing solution, in the refrigeration state, the thermal management sub-loop 20B is switched to performing heat exchange with the condensing heat exchanger 12, so that the external heat exchanger 27 in the thermal management sub-loop 20B can be fully utilized to dissipate heat from the condensing heat exchanger 12, thereby improving the heat dissipation performance of the condensing heat exchanger 12 and reducing the working pressure of the compressor 11.

In some embodiments, the air-conditioning system 10 further includes a first air-conditioning switching component 17. The thermal management sub-loop 20B and the air-conditioning loop 10B are each connected to the condensing heat exchanger 12 through the first air-conditioning switching component 17. The control module is further capable of controlling the first air-conditioning switching component 17 to selectively supply the first heat-conducting medium in the thermal management sub-loop 20B and the second heat-conducting medium in the air-conditioning loop 10B to the condensing heat exchanger 12.

The first air-conditioning switching component 17 may be implemented by a three-way proportional valve or any other valve component or another element. In the air-conditioning system 10, the refrigeration state and the heating state are two working states that cannot coexist. Therefore, in the refrigeration state, the thermal management sub-loop 20B can be connected to the condensing heat exchanger 12 through the first air-conditioning switching component 17. In this case, the first heat-conducting medium can be supplied to the condensing heat exchanger 12, thereby implementing heat exchange between the first heat-conducting medium and the condensing heat exchanger 12. In the heating state, the air-conditioning loop 10B is connected to the condensing heat exchanger 12 through the first air-conditioning switching component 17, and the second heat-conducting medium can be supplied to the condensing heat exchanger 12, thereby implementing heat exchange between the second heat-conducting medium and the condensing heat exchanger 12. In this way, the first heat-conducting medium and the second heat-conducting medium can share a flow path in the condensing heat exchanger 12.

In the foregoing solution, the first heat-conducting medium and the second heat-conducting medium are selectively supplied to the condensing heat exchanger 12 through the first air-conditioning switching component, so that the thermal management sub-loop 20B and the air-conditioning loop 10B can share a flow path in the condensing heat exchanger 12. A structure of the condensing heat exchanger 12 is simplified.

As shown in FIG. 7, in some embodiments, the control module 21 switches, in response to the air-conditioning system 10 being in the refrigeration state, the thermal management sub-loop 20A to exchanging heat with the evaporation heat exchanger 15, to cool the battery module 41 by using the evaporation heat exchanger 15.

Because the refrigerant absorbs heat by evaporation in the evaporation heat exchanger 15, the refrigerant can absorb heat from the first heat-conducting medium in the thermal management sub-loop 20A. Then, heat is exchanged with the battery module 41 by using the cooled first heat-conducting medium, so that the battery module 41 can be cooled.

In the foregoing solution, in the refrigeration state, the thermal management sub-loop 20A is switched to exchanging heat with the evaporation heat exchanger 15, so that the battery module 41 can be cooled using the evaporation heat exchanger 15.

Figure 8:
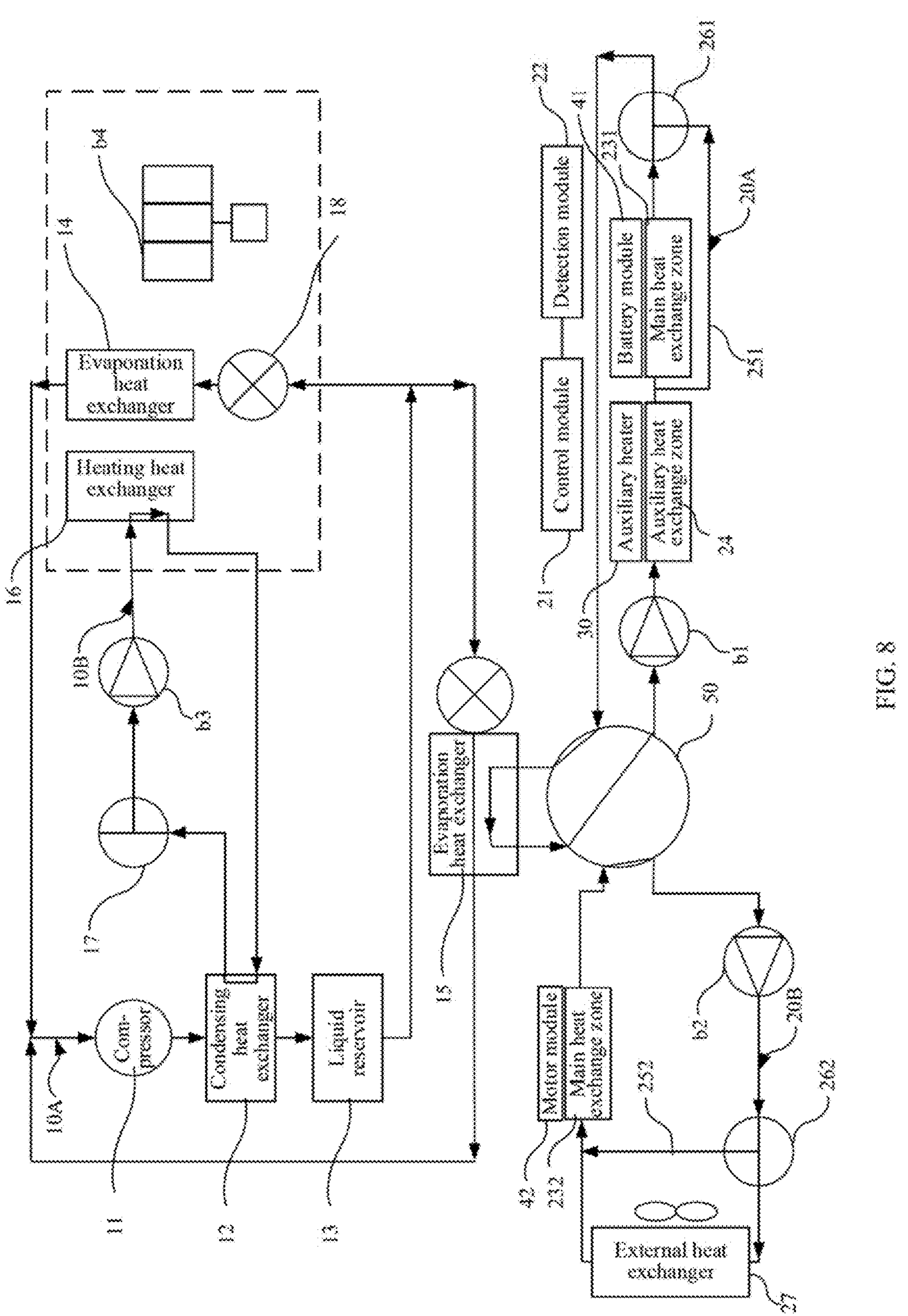
FIG. 8 is a schematic diagram of a working flow path of the thermal management system shown in FIG. 1 in a seventh working state.

As shown in FIG. 8, in some embodiments, the air-conditioning system 10 further includes the first air-conditioning switching component 17 and a second air-conditioning switching component 18. The control module controls, in response to the air-conditioning system 10 being in a dehumidification state, the first air-conditioning switching component 17 to connect the heating heat exchanger 16 and the condensing heat exchanger 12 and controls the second air-conditioning switching component 18 to connect the liquid reservoir 13 and the evaporation heat exchanger 14, so that dehumidified air cooled by the evaporation heat exchanger 14 is able to be heated by the heating heat exchanger 16.

Optionally, the first air-conditioning switching component 17 is located between the heating heat exchanger 16 and the condensing heat exchanger 12. The second air-conditioning switching component is located between the liquid reservoir 13 and the evaporation heat exchanger 14.

The second air-conditioning switching component 18 may be an electronic expansion valve with a switching function. The second air-conditioning switching component 18 is turned off in the heating state to prevent the refrigerant from evaporating and absorbing heat in the evaporation heat exchanger 14, which will affect the heating effect, and turned on in the refrigeration state to produce the cooling effect.

In the dehumidification state, the second air-conditioning switching component 18 is turned on based on the heating state. In this case, the water vapor in the airflow generated by a blower b4 is absorbed by the evaporation heat exchanger 14 and condensed to form liquid water, thereby achieving a dehumidification effect. The dehumidified airflow is further heated by the heating heat exchanger 16 to form a normal-temperature or heating airflow.

In the foregoing solution, the air-conditioning system 10 also has a dehumidification state by disposing the first air-conditioning switching component 17 and the second air-conditioning switching component 18. It should be noted that the above dehumidification state can be realized based on the heating state shown in any one of FIG. 2 to FIG. 6.

Figure 9:
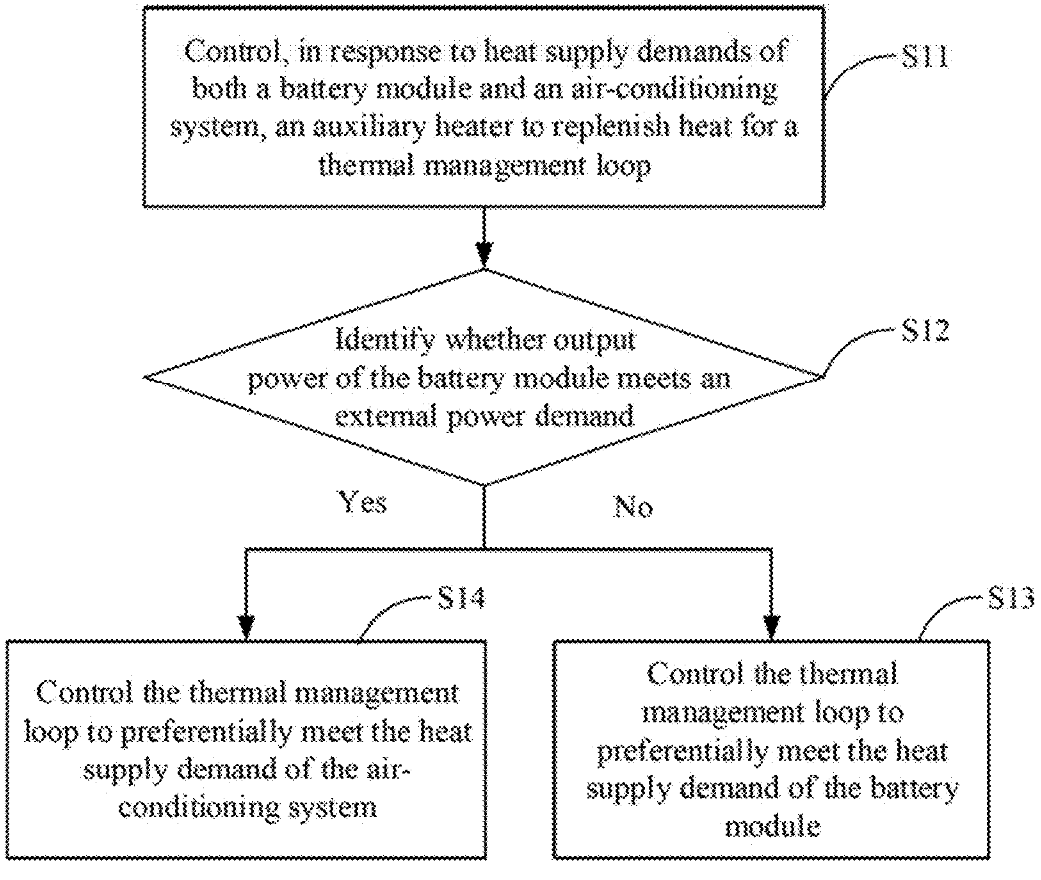
FIG. 9 is a schematic flowchart of an embodiment of a thermal management method for a transportation device according to this application.

As shown in FIG. 9, an embodiment further provides a thermal management method based on the foregoing thermal management system. The method includes the following steps.

Step S11: Control, in response to heat supply demands of both a battery module 41 and an air-conditioning system 10, an auxiliary heater 30 to replenish heat for a thermal management loop 20.

Step S12: Identify whether output power of the battery module 41 meets an external power demand.

In response to an identification result that the output power of the battery module 41 does not meet the external power demand, step S13 is performed. In response to an identification result that the output power of the battery module 41 can meet the external power demand, step S14 is performed.

Step S13: Control the thermal management loop 20 to preferentially meet the heat supply demand of the battery module 41.

Step S14: Control the thermal management loop 20 to preferentially meet the heat supply demand of the air-conditioning system 10.

In the foregoing solution, the auxiliary heater is disposed in the thermal management loop; under a condition that the transportation device is in a low-temperature working condition and both the battery module and the air-conditioning system have heat supply demands, the auxiliary heater is used to meet the heat supply demands of the battery module and the air-conditioning system separately; and based on working characteristics of the battery module and the air-conditioning system, the battery module is preferentially heated under a condition that the output power of the battery module does not meet the external power demand, so as to ensure normal working of the transportation device.

In some embodiments, the preferentially meeting the heat supply demand of the battery module 41 and the preferentially meeting the heat supply demand of the air-conditioning system 10 can be implemented by using the flow distribution mode of the bypass line 251 and the flow distribution component 261 described above. In some other embodiments, this may be implemented by other ways, such as through reasonable flow path setting. When the heat supply demand of the battery module 41 is preferentially met, a heated first heat-conducting medium is controlled to first exchange heat with the battery module 41 and then exchange heat with the air-conditioning system 10. When the heat supply demand of the air-conditioning system 10 needs to be met first, the heated first heat-conducting medium is controlled to first exchange heat with the air-conditioning system 10 and then exchange heat with the battery module 41.

In some embodiments, after the step of controlling, in response to the output power of the battery module 41 being capable of meeting the external power demand, the thermal management loop 20 to preferentially meet the heat supply demand of the air-conditioning system 10, the following steps may be further performed:

controlling, in response to the heat supply of the thermal management loop 20 to the air-conditioning system 10 reaching the heat supply demand of the air-conditioning system 10, the thermal management loop 20 to reduce heat supply to the air-conditioning system 10 and increase heat supply to the battery module 41; or controlling, in response to the heat supply of the thermal management loop 20 to the air-conditioning system 10 being lower than the heat supply demand of the air-conditioning system 10, the thermal management loop 20 to increase heat supply to the air-conditioning system 10 and reduce heat supply to the battery module 41.

Similarly, the foregoing method may be implemented by changing a heat exchange order of the first heat-conducting medium with the battery module 41 and the air-conditioning system 10 in addition to the flow distribution mode of the bypass line 251 and the flow distribution component 261 described above. In addition, a specific determining manner in the foregoing procedure has been described in detail above, and is not be repeated herein.

In the foregoing solution, the auxiliary heater 30 is disposed in the thermal management loop 20, so that the auxiliary heater 30 can replenish heat for the thermal management loop 20 and the air-conditioning system 10 can effectively absorb heat from the thermal management loop 20 under low-temperature and other working conditions, thereby reducing pressure of the air-conditioning system 10 and improving the heating effect of the air-conditioning system 10. In addition, the heating temperature of the auxiliary heater 30 only needs to ensure that the air-conditioning system 10 can absorb heat effectively, only part of heat supplied by the air-conditioning system 10 comes from the auxiliary heater 30, and the other part comes from the compression work inside the air-conditioning system 10. Therefore, specifications of the auxiliary heater 30 can be effectively reduced, a space utilization rate can be improved, and costs can be reduced.

It should be noted that the above thermal management method is not limited to the thermal management system described above, but also applicable to other scenes in which an auxiliary heater and a thermal management loop are used as low-temperature heat sources of an air-conditioning system.

Figure 10:
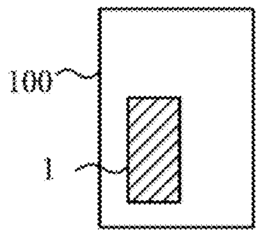
FIG. 10 is a schematic structural diagram of an embodiment of a transportation device according to this application.

Refer to FIG. 10. FIG. 10 is a schematic structural diagram of an embodiment of a transportation device according to this application. As shown in FIG. 10, the transportation device 100 provided in this embodiment includes the thermal management system 1 described in the foregoing thermal management system embodiment.

The transportation device 100 may be a device that can travel on traffic roads, such as vehicles, ships, airplanes and other devices with air-conditioning systems.

The thermal management system 1 includes an air-conditioning system (not shown), a thermal management loop (not shown), and an auxiliary heater (not shown). The thermal management loop is configured to circulate a first heat-conducting medium to perform thermal management on a specified part of the transportation device. The thermal management loop can be further configured to exchange heat with the air-conditioning system to selectively transfer heat generated by the specified part to the air-conditioning system at least when the air-conditioning system is in a heating state, to provide at least a partial heat source for an evaporation process of the air-conditioning system. The auxiliary heater is configured to selectively replenish heat for the thermal management loop. For a specific structure of the thermal management system 1, refer to the foregoing thermal management system embodiment. Details are not described herein again.

In the foregoing solution, in the thermal management system 1, the auxiliary heater (not shown) is arranged in the thermal management loop, so that the auxiliary heater can replenish heat for the thermal management loop, thereby ensuring that the air-conditioning system can effectively absorb heat from the thermal management loop under low-temperature and other working conditions, reducing the pressure of the air-conditioning system, and improving the heating effect of the air-conditioning system. In addition, the heating temperature of the auxiliary heater only needs to ensure that the air-conditioning system can absorb heat effectively, only part of heat supplied by the air-conditioning system comes from the auxiliary heater, and the other part comes from a compressor inside the air-conditioning system. Therefore, specifications of the auxiliary heater can be effectively reduced, a space utilization rate can be improved, and costs can be reduced.

In some embodiments, the transportation device further includes a drive system (not shown). The drive system is configured to drive the transportation device to run on the road.

In conclusion, it should be noted that the foregoing embodiments are for description of the technical solutions of this application only rather than for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the examples of this application. They should all be covered in the scope of claims and summary in this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A thermal management system for a transportation device, comprising:

an air-conditioning system;

a thermal management loop, wherein the thermal management loop is configured to:

circulate a first heat-conducting medium to perform thermal management on a specified part of the transportation device; and exchange heat with the air-conditioning system to selectively transfer heat generated by the specified part to the air-conditioning system at least when the air-conditioning system is in a heating state, to provide at least a partial heat source for an evaporation process of the air-conditioning system;

an auxiliary heater, wherein the auxiliary heater is configured to selectively replenish heat for the thermal management loop; and a control module;

wherein:

the thermal management loop comprises:

a main heat exchange zone for exchanging heat with the specified part;

an auxiliary heat exchange zone for exchanging heat with the auxiliary heater; and a flow distribution component and a bypass line connected in parallel with the main heat exchange zone; and the control module is configured to control, based on a heat supply demand of the specified part and a heat supply demand of the air-conditioning system, the flow distribution component to perform flow distribution on the first heat-conducting medium between the main heat exchange zone and the bypass line.

2. The thermal management system according to claim 1, wherein the control module is further configured to control, in response to the heat generated by the specified part not meeting the heat supply demand of the air-conditioning system, the auxiliary heater to replenish heat for the thermal management loop.

3. The thermal management system according to claim 2, further comprising:

a detection module, wherein the detection module is configured to detect an operating state or an operating environment of the air-conditioning system when the air-conditioning system is in the heating state;

wherein the control module is further configured to determine, based on a detection result of the detection module, whether the heat generated by the specified part meets the heat supply demand of the air-conditioning system.

4. The thermal management system according to claim 3, wherein the operating environment comprises temperature of the first heat-conducting medium, the detection module is configured to detect the temperature of the first heat-conducting medium before heat exchange between the first heat-conducting medium and the air-conditioning system, and the control module is configured to determine, in response to the temperature detected by the detection module being lower than a preset temperature threshold, that the heat generated by the specified part does not meet the heat supply demand of the air-conditioning system.

5. The thermal management system according to claim 2, wherein the control module is further configured to control, in response to the heat supply demand of the specified part, the auxiliary heater to replenish heat for the thermal management loop, so as to heat the specified part through the first heat-conducting medium.

6. The thermal management system according to claim 1, wherein the first heat-conducting medium flows to the main heat exchange zone and the bypass line after being heated by the auxiliary heat exchange zone, and exchanges heat with the air-conditioning system before entering the auxiliary heat exchange zone, or the first heat-conducting medium heated by the auxiliary heat exchange zone flows to the main heat exchange zone and the bypass line after exchanging heat with the air-conditioning system, and is heated by the auxiliary heat exchange zone after flowing through the main heat exchange zone and/or the bypass line.

7. The thermal management system according to claim 1, wherein the specified part is a battery module of the transportation device, and the control module is configured to:

control, in response to output power of the battery module not meeting an external power demand, the flow distribution component to preferentially meet the heat supply demand of the battery module through the auxiliary heater; or control, in response to output power of the battery module being capable of meeting an external power demand, the flow distribution component to preferentially meet the heat supply demand of the air-conditioning system through the auxiliary heater.

8. The thermal management system according to claim 7, wherein:

the preferentially meeting the heat supply demand of the battery module is to supply all the first heat-conducting medium to the main heat exchange zone or increase a flow capacity of the first heat-conducting medium flowing to the main heat exchange zone, and the preferentially meeting the heat supply demand of the air-conditioning system is to supply all the first heat-conducting medium to the bypass line or increase a flow capacity of the first heat-conducting medium flowing to the bypass line; and the control module is further configured to, after the heat supply demand of the air-conditioning system is preferentially met:

control, in response to the thermal management loop meeting the heat supply demand of the air-conditioning system, the flow distribution component to reduce the flow capacity of the first heat-conducting medium flowing to the bypass line and increase the flow capacity of the first heat-conducting medium flowing to the main heat exchange zone; or control, in response to the thermal management loop not meeting the heat supply demand of the air-conditioning system, the flow distribution component to increase the flow capacity of the first heat-conducting medium flowing to the bypass line and reduce the flow capacity of the first heat-conducting medium flowing to the main heat exchange zone.

9. The thermal management system according to claim 1, wherein the thermal management loop comprises at least two thermal management sub-loops, the at least two thermal management sub-loops are configured to perform thermal management on different specified parts;

the thermal management system further comprising:

a thermal management switching component;

wherein the control module is further configured to control the thermal management switching component to selectively switch a heat exchange relationship between the at least two thermal management sub-loops and the air-conditioning system.

10. The thermal management system according to claim 9, wherein:

the specified part comprises the battery module and a motor module of the transportation device, and the at least two thermal management sub-loops comprise a first thermal management sub-loop and a second thermal management sub-loop;

the first thermal management sub-loop is configured to perform thermal management on the battery module, and comprises a first main heat exchange zone for heat exchange with the battery module and the auxiliary heat exchange zone for heat exchange with the auxiliary heater;

the second thermal management sub-loop is configured to perform thermal management on the motor module and comprises a second main heat exchange zone for heat exchange with the motor module and an external heat exchanger for heat exchange with an external environment; and the control module is further configured to control, in response to the air-conditioning system being in the heating state, the thermal management switching component to switch at least one of the first thermal management sub-loop and the second thermal management sub-loop to exchange heat with the air-conditioning system.

11. The thermal management system according to claim 10, wherein the control module is further configured to control, in response to the air-conditioning system being in the heating state, the thermal management switching component to switch the first thermal management sub-loop and the second thermal management sub-loop to simultaneously exchanging heat with the air-conditioning system.

12. The thermal management system according to claim 10, wherein the control module is further configured to control the thermal management switching component to connect the first thermal management sub-loop and the second thermal management sub-loop, so that the first heat-conducting medium circulates in an entire loop formed by the first thermal management sub-loop and the second thermal management sub-loop.

13. The thermal management system according to claim 10, wherein the first thermal management sub-loop further comprises a first flow distribution component and a first bypass line connected in parallel with the first main heat exchange zone, and wherein the control module is further configured to control, based on the heat supply demand of the specified part and the heat supply demand of the air-conditioning system, the first flow distribution component to perform flow distribution on a first heat-conducting medium in the first thermal management sub-loop between the first main heat exchange zone and the first bypass line.

14. The thermal management system according to claim 10, wherein the second thermal management sub-loop further comprises a second flow distribution component and a second bypass line connected in parallel with the external heat exchanger, and wherein the control module is further configured to control, based on a heat dissipation demand of the motor module, the heat supply demand of the air-conditioning system, or the external environment of the external heat exchanger, the second flow distribution component to perform flow distribution on a first heat-conducting medium in the second thermal management sub-loop between the external heat exchanger and the second bypass line.

15. The thermal management system according to claim 14, wherein the control module is further configured to:

in response to the motor module having no additional heat dissipation demand after supplying heat to the air-conditioning system or the motor module being incapable of meeting the heat supply demand of the air-conditioning system and incapable of absorbing heat from the environment through the external heat exchanger, introduce all the first heat-conducting medium in the second thermal management sub-loop into the second bypass line or increases the flow capacity of the first heat-conducting medium flowing to the bypass line; or in response to the motor module still having an additional heat dissipation demand after supplying heat to the air-conditioning system or the motor module being incapable of meeting the heat supply demand of the air-conditioning system and capable of absorbing heat from the environment through the external heat exchanger, introduce all the first heat-conducting medium in the second thermal management sub-loop into the external heat exchanger or increases the flow capacity of the first heat-conducting medium flowing to the external heat exchanger.

16. The thermal management system according to claim 9, wherein:

the air-conditioning system comprises a first air-conditioning loop and a second air-conditioning loop;

the first air-conditioning loop is configured to circulate a refrigerant and comprises a compressor, a condensing heat exchanger, a liquid reservoir, a first evaporation heat exchanger, and a second evaporation heat exchanger, wherein the refrigerant absorbs heat by evaporation in the first evaporation heat exchanger, to cool a specified region of the transportation device by air conditioning, and the refrigerant absorbs heat by evaporation in the second evaporation heat exchanger, to absorb heat from the thermal management loop; and the second air-conditioning loop is configured to circulate a second heat-conducting medium and comprises a heating heat exchanger, wherein the heating heat exchanger exchanges heat with the condensing heat exchanger, to heat the specified region by air conditioning.

17. The thermal management system according to claim 16, wherein the control module is further configured to control, in response to the air-conditioning system being in a refrigeration state, the thermal management switching component to switch the second thermal management sub-loop to exchanging heat with the condensing heat exchanger, to transfer heat released by the condensing heat exchanger to the external heat exchanger.

18. The thermal management system according to claim 16, wherein the air-conditioning system further comprises a first air-conditioning switching component, the second thermal management sub-loop and the second air-conditioning loop are each connected to the condensing heat exchanger through the first air-conditioning switching component, and the control module is further configured to control the first air-conditioning switching component to selectively supply the first heat-conducting medium in the second thermal management sub-loop and the second heat-conducting medium in the second air-conditioning loop to the condensing heat exchanger.

19. A thermal management system for a transportation device, comprising:

an air-conditioning system comprising a first air-conditioning loop, a second air-conditioning loop, and a first air-conditioning switching component;

a thermal management loop, wherein the thermal management loop is configured to:

circulate a first heat-conducting medium to perform thermal management on a specified part of the transportation device; and exchange heat with the air-conditioning system to selectively transfer heat generated by the specified part to the air-conditioning system at least when the air-conditioning system is in a heating state, to provide at least a partial heat source for an evaporation process of the air-conditioning system;

an auxiliary heater, wherein the auxiliary heater is configured to selectively replenish heat for the thermal management loop;

a control module, wherein the control module is configured to control, in response to the heat generated by the specified part not meeting a heat supply demand of the air-conditioning system, the auxiliary heater to replenish heat for the thermal management loop; and a thermal management switching component;

wherein:

the thermal management loop comprises at least two thermal management sub-loops, the at least two thermal management sub-loops are configured to perform thermal management on different specified parts;

the control module is configured to control the thermal management switching component to selectively switch a heat exchange relationship between the at least two thermal management sub-loops and the air-conditioning system;

the first air-conditioning loop is configured to circulate a refrigerant and comprises a compressor, a condensing heat exchanger, a liquid reservoir, a first evaporation heat exchanger, and a second evaporation heat exchanger, wherein the refrigerant absorbs heat by evaporation in the first evaporation heat exchanger, to cool a specified region of the transportation device by air conditioning, and the refrigerant absorbs heat by evaporation in the second evaporation heat exchanger, to absorb heat from the thermal management loop;

the second air-conditioning loop is configured to circulate a second heat-conducting medium and comprises a heating heat exchanger, wherein the heating heat exchanger exchanges heat with the condensing heat exchanger, to heat the specified region by air conditioning; and the second thermal management sub-loop and the second air-conditioning loop are each connected to the condensing heat exchanger through the first air-conditioning switching component, and the control module is configured to control the first air-conditioning switching component to selectively supply the first heat-conducting medium in the second thermal management sub-loop and the second heat-conducting medium in the second air-conditioning loop to the condensing heat exchanger.

20. A thermal management system for a transportation device, comprising:

an air-conditioning system;

a thermal management loop, wherein the thermal management loop is configured to:

circulate a first heat-conducting medium to perform thermal management on a specified part of the transportation device; and exchange heat with the air-conditioning system to selectively transfer heat generated by the specified part to the air-conditioning system at least when the air-conditioning system is in a heating state, to provide at least a partial heat source for an evaporation process of the air-conditioning system;

an auxiliary heater, wherein the auxiliary heater is configured to selectively replenish heat for the thermal management loop;

a control module, wherein the control module is configured to control, in response to the heat generated by the specified part not meeting a heat supply demand of the air-conditioning system, the auxiliary heater to replenish heat for the thermal management loop; and a thermal management switching component;

wherein:

the thermal management loop comprises at least two thermal management sub-loops, the at least two thermal management sub-loops are configured to perform thermal management on different specified parts;

the control module is configured to control the thermal management switching component to selectively switch a heat exchange relationship between the at least two thermal management sub-loops and the air-conditioning system;

the specified part comprises the battery module and a motor module of the transportation device, and the at least two thermal management sub-loops comprise a first thermal management sub-loop and a second thermal management sub-loop;

the first thermal management sub-loop is configured to perform thermal management on the battery module, and comprises a first main heat exchange zone for heat exchange with the battery module and the auxiliary heat exchange zone for heat exchange with the auxiliary heater;

the second thermal management sub-loop is configured to perform thermal management on the motor module and comprises a second main heat exchange zone for heat exchange with the motor module and an external heat exchanger for heat exchange with an external environment; and the control module is further configured to control, in response to the air-conditioning system being in the heating state, the thermal management switching component to switch at least one of the first thermal management sub-loop and the second thermal management sub-loop to exchange heat with the air-conditioning system; and wherein:

the first thermal management sub-loop further comprises a first flow distribution component and a first bypass line connected in parallel with the first main heat exchange zone, and wherein the control module is further configured to control, based on the heat supply demand of the specified part and the heat supply demand of the air-conditioning system, the first flow distribution component to perform flow distribution on a first heat-conducting medium in the first thermal management sub-loop between the first main heat exchange zone and the first bypass line; or the second thermal management sub-loop further comprises a second flow distribution component and a second bypass line connected in parallel with the external heat exchanger, and wherein the control module is further configured to control, based on a heat dissipation demand of the motor module, the heat supply demand of the air-conditioning system, or the external environment of the external heat exchanger, the second flow distribution component to perform flow distribution on a first heat-conducting medium in the second thermal management sub-loop between the external heat exchanger and the second bypass line.

* * * * *